US007485978B2

(12) United States Patent
Pelrine et al.

(10) Patent No.: US 7,485,978 B2
(45) Date of Patent: Feb. 3, 2009

(54) COMPLIANT WALLED COMBUSTION DEVICES FOR PRODUCING MECHANICAL AND ELECTRICAL ENERGY

(75) Inventors: Ronald E. Pelrine, Longmont, CO (US); Scott E. Stanford, Mountain View, CA (US); Harsha Prahlad, Cupertino, CA (US); Seajin Oh, Palo Alto, CA (US); Jonathan Heim, Pacifica, CA (US); Roy D. Kornbluh, Palo Alto, CA (US)

(73) Assignee: SRI International, Menlo Park, CA (US)

( * ) Notice: Subject to any disclaimer, the term of this patent is extended or adjusted under 35 U.S.C. 154(b) by 0 days.

(21) Appl. No.: 11/763,148

(22) Filed: Jun. 14, 2007

(65) Prior Publication Data

US 2008/0093849 A1 Apr. 24, 2008

Related U.S. Application Data

(63) Continuation of application No. 11/134,077, filed on May 19, 2005, now Pat. No. 7,237,524.

(60) Provisional application No. 60/574,891, filed on May 26, 2004, provisional application No. 60/608,741, filed on Sep. 9, 2004.

(51) Int. Cl.
*F02B 63/04* (2006.01)
*F02F 7/00* (2006.01)
*H02N 2/00* (2006.01)

(52) U.S. Cl. .................. 290/1 R; 123/195 R; 310/339; 310/328

(58) Field of Classification Search ................. 290/1 R, 290/2, 1 A; 123/195 R; 310/363, 307, 339, 310/328
See application file for complete search history.

(56) References Cited

U.S. PATENT DOCUMENTS 4,328,772 A 5/1982 Heydrich et al.
4,442,372 A * 4/1984 Roberts ...................... 310/339
4,453,508 A 6/1984 Groeger
4,622,361 A 11/1986 Gill et al.
4,651,690 A 3/1987 Yang
4,800,858 A 1/1989 Yang
4,820,480 A 4/1989 David
4,823,745 A * 4/1989 Yang ........................ 123/51 R (Continued)

OTHER PUBLICATIONS

Cooley et al., "Hot Firing of a Full Scale Copper Tubular Combustion Chamber," 6th International Symposium Propulsion for Space Transportation of the XX1st century, May 14-17, 2002, Versailles, France.

(Continued)

*Primary Examiner*—Julio Gonzalez
(74) *Attorney, Agent, or Firm*—Beyer Law Group LLP

(57) ABSTRACT

Combustion devices described herein comprise a compliant combustion chamber wall or segment. The compliant segment deforms during combustion in the combustion chamber. Some devices may include a compliant wall configured to stretch responsive to pressure generated by combustion of a fuel in the combustion chamber. A coupling portion translates deformation of the compliant segment or wall into mechanical output. One or more ports are configured to inlet an oxygen source and fuel into the combustion chamber and to outlet exhaust gases from the combustion chamber.

19 Claims, 17 Drawing Sheets

U.S. PATENT DOCUMENTS

| | | | | | |
|---|---|---|---|---|---|
| 4,845,688 | A * | 7/1989 | Butler | 367/174 |
| 4,872,432 | A | 10/1989 | Rao et al. | |
| 5,105,621 | A | 4/1992 | Simmons et al. | |
| RE34,143 | E | 12/1992 | Rao et al. | |
| 5,305,684 | A | 4/1994 | Melchior | |
| 5,503,133 | A | 4/1996 | Trigger | |
| 5,603,217 | A | 2/1997 | Majersik et al. | |
| 5,711,283 | A | 1/1998 | Trigger | |
| 6,062,210 | A | 5/2000 | Welles | |
| 6,186,110 | B1 | 2/2001 | Hamelink et al. | |
| 6,209,496 | B1 | 4/2001 | Pelz | |
| 6,220,215 | B1 | 4/2001 | Morimoto | |
| 6,283,070 | B1 | 9/2001 | Deckard et al. | |
| 6,289,888 | B1 | 9/2001 | Welles | |
| 6,314,933 | B1 | 11/2001 | Iijima et al. | |
| 6,363,902 | B1 | 4/2002 | Strasser et al. | |
| 6,417,263 | B1 | 7/2002 | DeGroot, Jr. et al. | |
| 6,460,327 | B1 | 10/2002 | Nagel | |
| 6,511,075 | B1 | 1/2003 | Schmidt | |
| 6,545,384 | B1 * | 4/2003 | Pelrine et al. | 310/309 |
| 6,551,076 | B2 | 4/2003 | Boulware | |
| 6,606,970 | B2 | 8/2003 | Patton | |
| 6,628,040 | B2 * | 9/2003 | Pelrine et al. | 310/307 |
| 6,705,207 | B2 | 3/2004 | Murase et al. | |
| 6,781,284 | B1 * | 8/2004 | Pelrine et al. | 310/330 |
| 6,806,621 | B2 | 10/2004 | Heim et al. | |
| 6,854,764 | B2 | 2/2005 | Larsen et al. | |
| 6,862,884 | B2 | 3/2005 | Cohen et al. | |
| 6,862,977 | B2 | 3/2005 | Glinsner et al. | |
| 6,966,761 | B1 | 11/2005 | Roke et al. | |
| 6,982,497 | B2 * | 1/2006 | Rome | 290/1 A |
| 7,064,472 | B2 * | 6/2006 | Pelrine et al. | 310/324 |
| 7,166,953 | B2 | 1/2007 | Heim et al. | |
| 7,237,524 | B2 * | 7/2007 | Pelrine et al. | 123/195 R |
| 7,240,655 | B2 * | 7/2007 | Pelrine et al. | 123/195 R |
| 7,362,032 | B2 * | 4/2008 | Pelrine et al. | 310/309 |
| 2001/0032663 | A1 * | 10/2001 | Pelrine et al. | 136/205 |
| 2002/0185937 | A1 * | 12/2002 | Heim et al. | 310/339 |
| 2004/0008853 | A1 * | 1/2004 | Pelrine et al. | 381/191 |

OTHER PUBLICATIONS

Shkolnik, "Liquid Piston," Cambridge University Technology and Enterprise Club, http://www.cutec.org/CAVCC/CTS/LiquidPiston.php., no date provided.

Presentation made by inventor at DARPA Meeting, Mar. 2003.

Presentation at Army/Navy/Airforce Conference, Mar. 2003.

Progress Report submitted to DARPA May 2002, covering the period Feb. 1, 2002-Apr. 30, 2002.

Progress Report submitted to DARPA May 2002, covering the period May 1, 2002-May 31, 2002.

Progress Report submitted to DARPA Jun. 2002, covering the period Jun. 1, 2002-Jun. 30, 2002.

Final Progress Report submitted to DARPA Sep. 2002, covering the period Feb. 2002-Jul. 2002.

International Search Report dated Apr. 22, 2008 in PCT Application No. PCT/US05/18109.

Written Opinion dated Apr. 22, 2008 in PCT Application No. PCT/US05/18109.

Presentation at Army/Navy/Airforce Conference.

Update of previous reference U: Presentation at Army/Navy/Airforce Conference.

* cited by examiner

COMPLIANT WALLED COMBUSTION DEVICES FOR PRODUCING MECHANICAL AND ELECTRICAL ENERGY

CROSS-REFERENCE TO RELATED APPLICATIONS

This application is a continuation and claims priority under U.S.C. §120 from co-pending U.S. patent application Ser. No. 11/134,077, filed May 19, 2005 and entitled "COMPLIANT WALLED COMBUSTION DEVICES", which is incorporated herein for all purposes; the 11/134,077 application claimed priority under 35 U.S.C. §119(e) from U.S. Provisional Patent Application No. 60/574,891 filed May 26, 2004, naming R. Pelrine et al. as inventors, and titled "Polymer Engines For Lightweight Portable Power", which is incorporated by reference herein in its entirety for all purposes; the 11/134,077 application also claimed priority under 35 U.S.C. §119(e) from U.S. Provisional Patent Application No. 60/608,741 filed Sep. 9, 2004, which is also incorporated by reference herein in its entirety for all purposes.

U.S. GOVERNMENT RIGHTS

This invention was funded in part with Government support under contract number DAAD19-03C-0067 awarded by the United States Army. The Government has certain rights in this invention.

FIELD OF THE INVENTION

The present invention relates generally to combustion devices that convert chemical energy stored in a fuel to mechanical energy. More particularly, the present invention relates to combustion devices that include one or more compliant sections or walls that deform in response to combustion.

BACKGROUND OF THE INVENTION

Combustion devices that employ a metal piston and rigid combustion chamber to generate mechanical power are well developed and widely used.

Conventional combustion devices tend to be relatively heavy and non-portable. At smaller scales and lower weights, the efficiency of combustion systems rapidly decreases. Small-scale engines also suffer from leakage in the piston-cylinder gap, which is normally a negligible loss for larger engines. Since the piston-cylinder gap cannot be readily scaled down with engine size, leakage becomes more problematic as engine size decreases. Other problems associated with rigid combustion-based systems—at any size—include corrosion, temperature warping in small gaps, and wear. Rigid combustion systems of any size also need to be relatively heavy to achieve the rigidity needed to maintain tight tolerances in the piston-cylinder gap.

Many portable devices employ one or more batteries as a power source. Disposable or rechargeable batteries are used in most portable electronic devices for example. Intermittent bursts of power are important in the design and operation of many portable devices, where batteries often fall short. Batteries by themselves also offer no mechanical output; electrical output from them must be supplied to a motor to produce mechanical work.

In view of the foregoing, alternative power generation and combustion devices, particularly those suitable for mobile and portable use, would be desirable.

SUMMARY OF THE INVENTION

Combustion devices of the present invention employ a compliant wall or segment that borders at least a part of a combustion chamber and deforms in response to pressure generated during combustion of a fuel in the combustion chamber.

Some compliant walls or segments stretch during combustion. The compliant segment may decrease in thickness during the stretch. Compliant segment thickness decreases often lead to a dynamic increase in combustion chamber volume. This raises maximum volume for a combustion chamber, which increases combustion efficiency and volume displacement for a given linear displacement.

Compliant segments and walls may also dynamically vary surface area of the combustion chamber, which improves thermal management. During and after combustion, compliant walls may increase their surface area and provide a greater area for conductive heat transfer out of the chamber. When a compliant wall thins, the conductive heat transfer path through the wall also shortens, which further increases thermal dissipation.

Some combustion devices elastically stretch a compliant wall during combustion. Elastic return of the compliant wall may be used to facilitate exhaust of combustion products from a combustion chamber.

In one aspect, the present invention relates to a combustion device for producing mechanical energy from a fuel. The combustion device comprises a set of walls that border a combustion chamber. The set of walls include a compliant segment configured to deform to increase volume of the chamber during combustion of the fuel in the combustion chamber. The combustion device also comprises a coupling portion that translates the increase in the volume of the chamber into mechanical output. The combustion device further comprises one or more ports configured to inlet an oxygen source and fuel into the combustion chamber and to outlet exhaust gases from the combustion chamber.

In another aspect, the present invention relates to a combustion device for producing mechanical energy from a fuel. The combustion device comprises a constraint that reduces deformation of a portion of a compliant segment during combustion.

In yet another aspect, the present invention relates to a method for producing mechanical energy from a fuel. The method comprises providing a fuel and oxygen into a combustion chamber. The method also comprises combusting the fuel in the combustion chamber. The method further comprises decreasing thickness for a portion of a compliant segment included in a set of walls that border the combustion chamber such that volume for the combustion chamber increases with the thickness decrease.

In still another aspect, the present invention relates to a method for improving thermal management of a combustion device. The method comprises stretching a compliant segment included in a set of walls that border the combustion chamber. Stretching the compliant segment increases surface area for the set of walls that border the combustion chamber. The method also comprises dissipating heat produced in the combustion chamber through the stretched compliant segment.

In another aspect, the present invention relates to a combustion device for producing mechanical energy from a fuel. The combustion device comprises a set of walls that border a substantially cylindrical combustion chamber. The set of walls include a substantially cylindrical compliant segment configured to axially stretch during combustion of the fuel in the combustion chamber such that a diameter for the substantially cylindrical combustion chamber increases during combustion of the fuel.

In yet another aspect, the present invention relates to a combustion device for producing mechanical energy from a fuel. The combustion device comprises a set of walls that border a combustion chamber. The set of walls include a compliant segment configured to stretch during combustion of the fuel in the combustion chamber such that thickness for the compliant segment decreases during combustion of the fuel and such that volume for the combustion chamber increases as a result of the thickness decrease in the compliant segment.

In still another aspect, the present invention relates to a combustion cycle for producing mechanical energy from a fuel. The cycle comprises providing a fuel and oxygen into a combustion chamber. The cycle also comprises combusting the fuel in the combustion chamber. The cycle further comprises, using forces generated in the combustion, stretching a compliant segment included in a set of walls that border the combustion chamber. The cycle additionally comprises at least partially exhausting combustion products using elastic return of the stretched segment.

These and other features and advantages of the present invention will be described in the following description of the invention and associated figures.

DETAILED DESCRIPTION OF THE PREFERRED EMBODIMENTS

The present invention is described in detail with reference to a few preferred embodiments as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

Overview

Combustion refers to a rapid chemical change that produces mechanical energy. The chemical change usually burns a fuel to produce heated gases and pressure resulting from expansion of the heated gases. Combustion thus allows a small amount of fuel, when ignited in a combustion chamber, to produce mechanical energy in the form of an expanding gas.

Combustion devices of the present invention include a compliant wall or compliant segment that stretches in response to mechanical energy communicated by an expanding gas. Coupling to a portion of the combustion device permits the mechanical energy to perform useful work. In some embodiments, a combustion device includes a single material (other than any mechanisms employed for inlet to and exhaust from the combustion chamber) where one portion of the material moves, another portion remains stationary, and a compliant segment that deforms to permit relative motion between the moving and stationary portions.

Figure 1A:
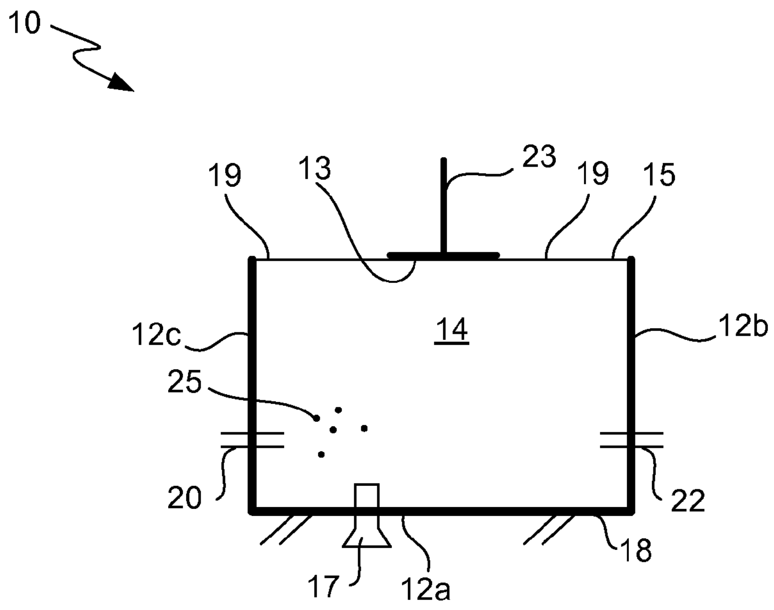
FIG. 1A shows a simplified combustion device in accordance with one embodiment of the present invention.
Figure 1B:
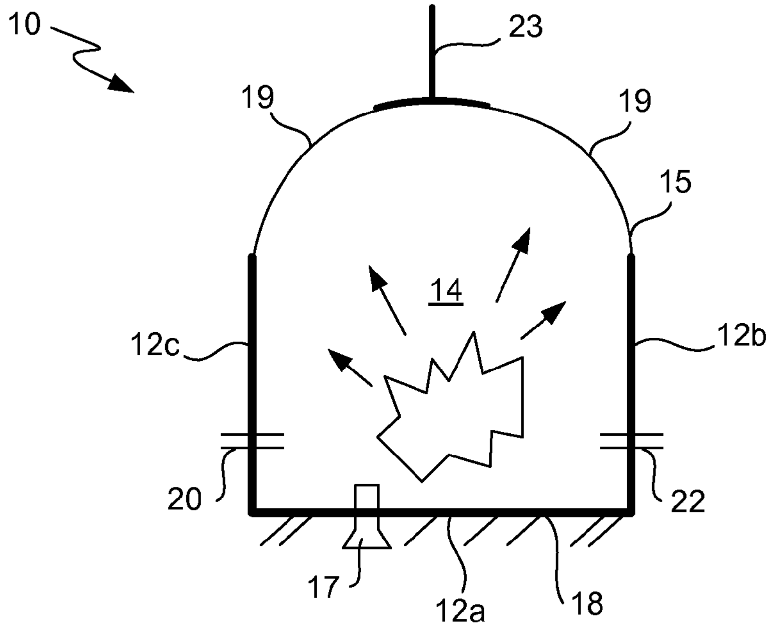
FIG. 1B illustrates the combustion device of FIG. 1A after combustion.

FIG. 1A shows a simplified combustion device 10 in accordance with one embodiment of the present invention. FIG. 1B illustrates device 10 after combustion in combustion chamber 14. Combustion device 10 relies on deformation of a segment 19 of a compliant wall 15 to harness combustion energy and provide mechanical output. While the present invention will now be discussed in terms combustion devices and components include therein, those skilled in the art will appreciate that the following discussion will also illuminate methods and discrete steps for using combustion devices and for producing mechanical energy from a fuel.

Combustion device 10 includes a set of walls 12 and 15 that border a combustion chamber 14. Walls 12 are rigid, while wall 15 is compliant. In general, a combustion device of the present invention may include any number of walls of any geometry suitable for bounding and defining dimensions a combustion chamber 14. At least one wall—or a portion thereof—in device 10 includes a compliant segment 19 or compliant wall 15 that deforms, e.g., stretches, in response to forces generated by combustion of a fuel in combustion chamber 14. As will be described below, compliant wall 15 may constitute varying proportions of the wall surface surrounding combustion chamber 14 and may include numerous geometries based on a particular combustion device design. The compliant wall 15 may also include one or more rigid portions, e.g. 19 may be a metal or rigid plastic reinforcement of complaint wall 15. In some cases, noncompliant walls 12 may be included such that mechanical energy in chamber 14 acts on a smaller area for compliant wall 15 or segment 19 and increases the force or displacement of compliant wall 15 and mechanical output 23. Combustion chamber 14 geometries, compliant wall 15 and compliant segment 19 configurations, and chamber wall configurations may vary. For example, the combustion chamber and compliant wall may include a diaphragm, tubular (cylindrical), balloon, or other volume-enclosing arrangement. Several exemplary geometries and configurations are described below.

Unconstrained portions of compliant wall 15, such as compliant segment 19, deform in response to expanding gases and pressure generated by combustion of a fuel 25 in combustion chamber 14. In general, deformation of a compliant segment or wall refers to any stretch, displacement, expansion, bending, contraction, torsion, linear or area strain, combinations thereof, or any other deformation of a portion of the compliant wall 15. In one embodiment, compliant segment 19 stretches in response to expanding gases and pressure caused by combustion of fuel 25. Elastic stretching of a compliant wall 15 or segment 19 also stores elastic mechanical energy. Several embodiments of the present invention make use of elastic energy storage in wall 15 or segment 19. For example, after combustion, compliant wall 15 may elastically return to a pre-combustion state or position, which provides a mechanism for assisting exhaust of combustion gases from chamber 14. While some designs elastically stretch to expand the combustion chamber, other designs employ more of a bending mode, or both bending and stretching. Various materials and configurations for compliant wall 15 are described in further detail below.

For the device 10 of FIG. 1, compliant wall 15 forms a top wall of the combustion chamber 14. In some cases, compliant wall 15 includes portions that do not stretch, such as those used for fixing compliant wall 15 to one or more rigid walls included in the set of walls 12 or a mechanical output. For the device of FIG. 1, a central portion of compliant wall 15 attaches to a rigid mechanical output 23. This leaves a compliant segment 19 that includes all portions of compliant wall 15 not attached to mechanical output 23 or portions of compliant wall 15 used to attach to rigid walls 12. When combustion chamber 14 is substantially cylindrical and mechanical output 23 is round, compliant segment 19 resembles a donut shape on wall 15. In another embodiment, central segment 19 is not compliant and includes a stiffer material than compliant wall 15. In this case, the central segment 19 is relatively rigid and the compliant segment for device 10 includes an outer ring around the central rigid segment 19; this allows compliant wall/segment 15 to expand and drive the central rigid segment 19 and mechanical output 23 attached thereto.

The set of walls 12 (including compliant wall 15) cooperate to form and enclose combustion chamber 14. As the term is used herein, a combustion chamber refers to an enclosed space in which combustion of a fuel occurs to produce mechanical energy. A wide variety of physical configurations may be used for the combustion chamber. By way of example, suitable physical configurations may include spherical geometries, square and rectangular geometries, cylindrical geometries, oval and elliptical geometries, and a variety of other geometries (several of which are described below). In general, the present invention is not limited to any particular combustion chamber design or shape.

The volume of combustion chamber 14 varies as compliant wall 15 deforms. Combustion chamber 14 typically has a maximum volume and a minimum volume. ‘Displacement’ refers to the difference between the maximum and minimum volume. Typically, increasing displacement permits greater mechanical output for a combustion device. For some combustion devices, the maximum volume additionally increases as a compliant wall 15 or segment 19 stretches and its thickness decreases.

In one embodiment, combustion device 10 includes no piston that translates within the combustion chamber. In many cases, combustion device includes no moving parts internal to combustion chamber 14 other than any inlet or outlet valve mechanisms (or parts thereof) disposed within the combustion chamber. These designs avoid friction between moving parts within the combustion chamber 14 and reduce energy losses that result from frictional heat generation. These designs also avoid the need for lubrication in combustion chamber 14 between moving parts. Some designs may include a piston as mechanical output coupled to the outside of compliant wall 15 and acting as a linear mechanical output 23 to use energy produced within chamber 14, but even in these instances, the designs include no piston that translates within the combustion chamber. This is in contrast to conventional combustion chambers where the piston is internal to the combustion chamber (or it forms a wall that translates in the cylinder, requires sealing, and requires lubrication internal to the cylinder to reduce friction between moving parts).

Combustion device 10 includes one or more ports configured to inlet an oxygen source such as air and fuel into combustion chamber 14 and to outlet exhaust gases from combustion chamber 14. Inlet and outlet of reactants and products into and out from a combustion chamber is well known to one of skill in the art and the present invention is not limited by how reactants are provided to a combustion chamber and how products are removed from the combustion chamber. Slightly pressurized fresh fuel-air can be injected through and inlet port to force out exhaust through an outlet port, for example. Other higher efficiency methods are known in the prior art and some are described later in this patent. Some combustion device designs may include a single and common inlet/outlet port. In other designs two ports may be provided. By way of example, in the embodiment shown in FIG. 1A, device 10 includes two ports: an inlet port 20 and an outlet port 22. In other designs three or more ports may be employed.

Intake port 20 permits an oxygen source and fuel passage into combustion chamber 14. Intake port 20, also commonly referred to as an intake valve, opens at specified times to let in air and/or fuel into combustion chamber 14. Device 10 inlets a combined air/fuel mixture. In a specific embodiment, intake port 20 includes valve sealed by an electrostatic clamp or an electroactive polymer actuated valve, or a valve incorporating both. Other actuated valves such as solenoid valves are known in the prior art and can be used. In another embodiment, device 10 includes separate and dedicated air and fuel ports 20.

An oxygen source is supplied to combustion device 10. Air readily provides oxygen, but other oxygen sources and oxidizing agents may be used. For example, the oxygen source may include $O_2$-enriched air, or pure oxygen. $O_2$ enrichment in the combustion air can reduce inert gas volume (i.e., $N_2$) and increase combustion capacity. The oxidizing agent may include a chemical oxidant beyond oxygen or air, as one of skill in the art will appreciate. While the present invention will now primarily be described with respect to air as the oxygen source in a combustion device, it is understood that other oxidants beyond oxygen or air may also be used.

Fuel 25 acts as a source of chemical energy for combustion device 10. Fuel 25 may be stored in a separate storage device, such as a tank. In some embodiments, a pump of some type transfers fuel 25 from storage to fuel inlet 20. In other embodiments, the fuel is stored under a pressure that is higher than atmospheric pressure, and its intake regulated by a valve. If the combustion device includes carburetion, the pump may also move external air or a stored oxidizer into combustion chamber 14. Fuel 25 may be stored in a liquid, gaseous, solid or gel-state. Exemplary fuels 25 suitable for use with the present invention include hydrocarbon based fuels such as propane, butane, natural gas, kerosene, gasoline, diesel, coal-derived fuels, JP8, hydrogen and the like. As with most engines, butane or propane are relatively easier fuels to burn.

Exhaust port 22 permits the discharge of combustion products. Exhaust port 22, which is also commonly referred to as an exhaust valve, opens at specified times in a combustion cycle to let out exhaust gases. The exhaust includes chemical products of the combustion process, along with any unprocessed reactants such as unconsumed fuel or extra air. Device 10 may include multiple exhaust ports 22 to improve exhaust of combustion products from combustion chamber 14. Additional exhaust system components may receive exhaust gases from port 22 and direct them as desired. For example, mechanical devices may be included to decrease back pressure for removing gases from combustion chamber 14. Outlet of exhaust from a combustion chamber is well known to one of skill in the art and the present invention is not limited by how products are exhausted from a combustion chamber.

Coupling portions 18 and 13 each generally refer to a portion of device 10 that permits external mechanical attachment to device 10. Typically, one of coupling portions 18 and 13 remains stationary relative to device 10, while the other is configured to move relative to the stationary portion during combustion of fuel 25 in combustion chamber 14 and deformation of compliant wall 15. As shown in FIG. 1A, coupling portion 18 includes stationary rigid wall 12*a*. Attachment to coupling portion 18 prevents rigid portions of combustion device 10 from moving (e.g. rigid walls 12*a-c*). Coupling portion 13 includes a central portion of compliant wall 15 that translates with deformation of compliant segment 19. An adhesive may be used to attach an external object to a wall or portion of device 10, such as an adhesive that attaches mechanical output 23 to complaint wall 15, or another adhesive that attaches wall 12*a* to a fixed object. Suitable adhesives will depend on the materials being joined, as one of skill in the art will appreciate. Screws may also be used to attach to a portion of device 10, such as fixing wall 12*a* to a stationary object.

Deformation of compliant segment 19 allows mechanical output from combustion device 10 for mechanical energy produced by combustion within chamber 14. This deformation may be used to do mechanical work.

Output 23 couples to portion 13 and provides mechanical work. Coupling portion 13 includes a central area on the outer surface of complaint wall 15 that is externally attached to. Coupling between mechanical output 23 and portion 13 may include a) direct attachment between an outer surface of compliant wall 15 and mechanical output 23 and/or b) indirect attachment via one or more objects interconnected between the two components. Motion of output 23 may be constrained to linear translation by bearings (not shown) that limit movement of a shaft 23 to a single linear direction. In another embodiment, mechanical output 23 attaches to a large portion of the outside surface of compliant wall 15. This avoids instances where the compliant wall 15 may deform around coupling portion 13 and resistive mechanical output 23, and better converts combustion pressure to mechanical output 23. One or more joints or other flexibility may be left in the coupling to allow vertical deformation of a large surface on compliant wall 15.

Coupling to a combustion device may vary. For a cylindrical and linearly actuating combustion device 10 having a compliant cylindrical body (see FIG. 2A), coupling portion 13 may be disposed at one end of the cylindrical body, while stationary coupling portion 18 is disposed at the other cylindrical end and may attach to a pin that permits the combustion device 10 to pivot about the pin. Mechanical output 23 in this case may include connecting rod that interfaces with bearings and a crankshaft (see FIG. 16). In this case, combustion of a fuel in the combustion chamber forces the compliant body to expand and coupling portion 13 to rotate about the crankshaft. Other examples of coupling portions 18 and 13 and output mechanisms 23 that convert mechanical energy in the form of expanding gas in the combustion chamber to useful mechanical work are described below. In general, the present invention is not limited to any mechanical output or coupling used to harness mechanical energy from a combustion device. It is understood that additional mechanical output or coupling may be added to device 10 to facilitate external attachment and use of device 10 in a particular application. In general, any external attachment communicates forces with combustion device 10 and the point or locations at which the forces enter or exit combustion device 10 may be considered a coupling portion.

Ignition mechanism 17 (see FIG. 1B) ignites the air/fuel mixture and initiates combustion in combustion chamber 14. Common ignition mechanisms 17 include spark plugs and glow plugs, although other suitable ignition mechanisms may be used as well. A spark plug generates a spark via electrical input, and is typically timed according to a cycle such as at peak compression of an air/fuel mixture or position of the combustion chamber stroke. Some combustion devices of the present invention do not include an ignition mechanism and may rely on compression of the fuel to initiate spontaneous combustion.

In operation, air and fuel 25 enters combustion chamber 14. The air/fuel mixture ignites (via either compression or active ignition). The resulting combustion creates expanding gases, typically at an elevated temperature, that increase pressure within combustion chamber 14. The expanding gases and pressure stretch unconstrained portions of compliant wall 15 such as compliant segment 17. Compliant segment 19 continues to stretch until mechanical forces balance the combustive forces driving the stretch (or until a crankshaft coupled to mechanical output 23 that drives displacement determines otherwise). The mechanical forces include elastic restoring forces of the compliant wall 15 material and any external resistance provided by a device and/or load(s) coupled to mechanical output 23. The amount of stretching for wall 15 as a result of a combustion may also depend on a number of other factors such as the geometry and size of combustion chamber 14, the number and size of compliant walls 15 in device 10, the thickness and elastic modulus of each wall, the amount and type of fuel combusted, the compression ratio, the shape and size of mechanical output 23, the amount of air present, etc. Typically, both inlet port 20 and exhaust port 22 are closed during compression and combustion. After combustion, exhaust port 22 opens and releases exhaust gases from combustion chamber 14. Compression may be achieved, for example, using a crankshaft that couples to mechanical output 23 and drives compliant wall downward to decrease volume in the combustion chamber.

Compliant Walls

Having discussed an overview of a simplified combustion device in accordance with a specific embodiment of the present invention, exemplary compliant walls and materials will now be discussed.

As the term is used herein, a compliant wall generally refers to a wall that deforms in response to pressures or forces generated within a combustion chamber. In many instances, an entire wall is not free to deform in response to combustion forces. A compliant segment refers to a portion of a combustion chamber wall that deforms in response to pressures or forces generated within a combustion chamber. For example, ends of a compliant wall may be fixed while a central segment of the compliant wall is free to deform. Similarly, coupling portions of a compliant wall may be constrained from movement while another segment (such as the donut shape described above) is free to deform. In many embodiments, a compliant wall or compliant wall segment is configured to stretch during combustion of the fuel in the combustion chamber. While the discussion will now focus on compliant walls, it is understood that the following materials discussion also applied to compliant segments.

Stiffness of a compliant wall may vary according to design. In one embodiment, a stretching compliant wall includes an elastic modulus less than about 1 GPa. Bending walls may include a higher elastic modulus, such as Kevlar or another rigid material used in a bending design. A stretching compliant wall comprising an elastic modulus less than about 100 MPa is suitable for some applications. In a specific embodiment, a stretching compliant wall includes an elastic modulus less than about 10 MPa. Stiffness may be tailored for a device to achieve a desired amount of deformation, toughness, or device longevity. Decreasing stiffness provides more volumetric displacement within the combustion chamber for a given combustion pressure. Some devices may include a compliant wall with an elastic modulus between about 5 MPa and about 100 MPa.

Thickness of a compliant wall may be widely varied and the appropriate thickness will generally be a function of many factors, including size of the device or engine that incorporates the combustion chamber, the nature of the compliant material used, a desired useful life of the combustion chamber, a desired expansion of the combustion chamber, etc. By way of example a compliant wall thicknesses in the range of about 0.25 mm to about 4 cm (before combustion and deformation) is appropriate for many applications. In many applications, a compliant wall thickness in the range of about 5 mm to about 2 cm is suitable. Other thicknesses may be used. For example, walls thicker than 4 cm may also be used, although as the base thickness of the wall increases, it typically becomes more desirable to provide a cooling mechanism for the combustion device. After combustion, thickness of a compliant wall may vary with a number of factors such as pressures generated within the combustion chamber, temperatures generated within the chamber and stiffness for the compliant wall (based on the material elastic properties and any mechanical attachments).

For thick walls, the combustion device may include cooling structures such as water-cooled tubes within the wall. If the tubes are themselves compliant, action of the combustion device resulting from combustion may squeeze the tubes. Connecting one-way valves to the tubes then permits the device to pump its own cooling liquid. With these and other techniques, it should be noted that the effective thermal thickness of the wall (the distance heat needs to travel before being removed) may be less than the actual physical wall thickness.

In general, materials suitable for use with compliant walls described herein may include any material having suitable elastic properties and able to withstand the thermal loading associated with combustion. Exemplary materials may include polymers, acrylics, plastics, silicones, rubbers, reinforced fabrics (such as Kevlar), high temperature ceramic fabrics and papers provided they have minimal leakage (can be coated on the outer surface with an elastomer such as silicone), and structures made from combinations of rigid materials with flexible and compliant materials, for example. Exemplary polymers include high-density polyethylene and polyimide. Polymers with good temperature tolerance, such as high temperature acrylics and high temperature silicones, may be used. Polymer compliant walls suitable for use may include any compliant polymer or rubber (or combination thereof) having suitable elastic and thermal properties. Preferably, the polymer deformation is reversible over a wide range of strains. In a specific embodiment, compliant walls used with device 70 of FIG. 2A include HS IV RTV High Strength Moldmaking Silicone Rubber as produced by Dow Corning, Midland, Mich.

Relative to metals, most polymers include lower thermal conductance and thermal capacitance. As a result, the polymers absorb less heat from combustion within the combustion chamber and thereby increase efficiency.

With regard to heat tolerance, internal combustion gas temperatures may be much higher than the temperature of a chamber wall—due to localized cooling of the combustion gases. This is the approach taken in conventional engine designs. Indeed, the wall temperature of many conventional engines is typically limited to 150-260° C. (300-500° F.) because of oil lubricant usage. Some combustion devices made in accordance with the present invention have been operated with wall temperatures about 260° C., while many silicone materials for example are thermally rated above 300° C.

Experimental tests have established the viability of using high-temperature-combustion gases in compliant walled combustion devices. Firing frequencies in the range of 0.1 to 15 Hz have been used. Higher and lower frequency operation is contemplated. The combustion devices provided compliant wall tolerance to transient heating and used internal combustion gases in excess of 1000° C.; some tests used gases estimated to be in excess of 1500° C. Butane and propane were demonstrated in a combustion chamber up to 10,000 cycles, corresponding to about 3 hours of continuous operation at 1 Hz. Hydrogen fuel was also demonstrated. Longer lifetimes were also feasible in this instance; when the polymer engine tests were stopped upon reaching a 10,000-cycle target the combustion devices were still intact and functioning. In summary, internal combustion devices with compliant polymer walls and gas temperatures sufficiently high to enable useful and high efficiency have been developed and verified.

Varying Wall Thicknesses and Chamber Volumes

In many embodiments, compliant wall 15 decreases in thickness as a result of the stretching and expansion in an orthogonal planar direction. Decreasing thickness for a compliant wall increases combustion chamber volume for many designs.

In some cases, a compliant wall of the present invention can be described as substantially incompressible in volume for modeling and description purposes. That is, the compliant wall has a substantially constant volume under stress. For an incompressible compliant wall, the compliant wall decreases in thickness as a result of the expansion in an orthogonal planar direction. Decreasing thickness for a compliant wall may have volumetric and efficiency benefits for a combustion device. It is noted that the present invention is not limited to incompressible compliant walls and deformation of a compliant wall may not conform to such a simple relationship.

Figure 13A:
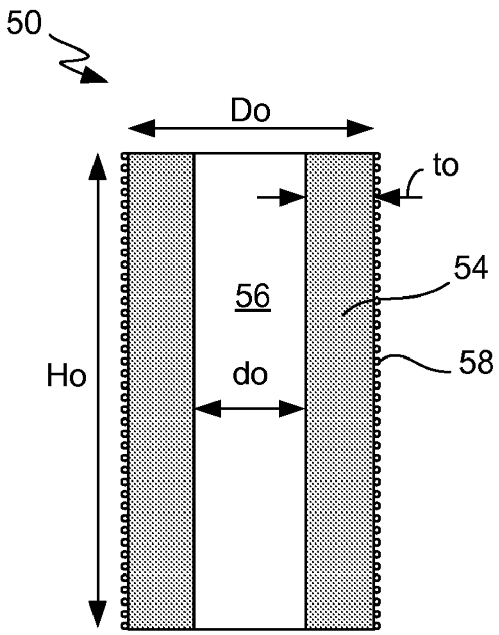
FIGS. 13A and 13B illustrate dynamic dimensions for the combustion device of FIG. 2A.
Figure 13B:
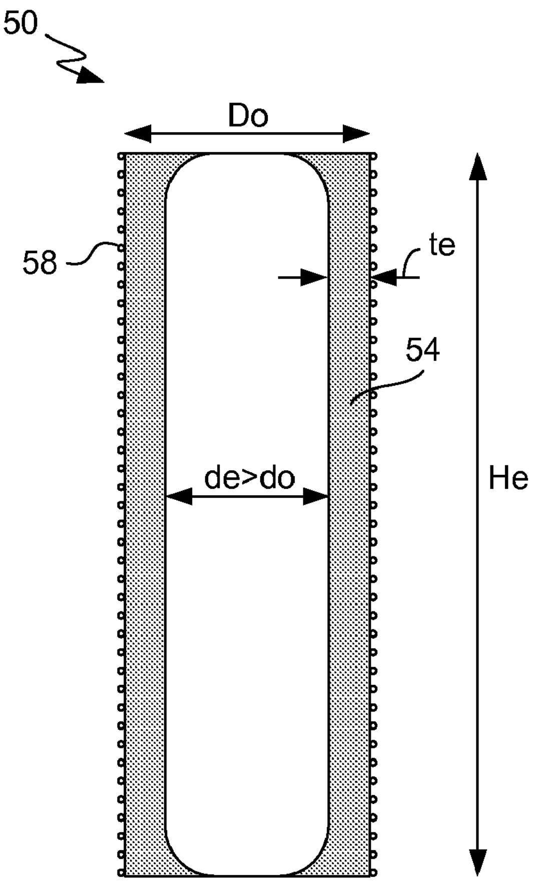

In one embodiment, thickness for a compliant wall—or portion of a compliant wall—decreases in response to combustion in the combustion chamber. Referring to FIGS. 13A-13B for example, device 50 may be characterized before combustion (FIG. 13A) by the following dimensions: an initial outer diameter, $D_o$, an initial inner diameter, $d_o$, an initial height, $H_o$, and an initial wall thickness, $t_o$. After combustion (FIG. 13B), device 50 may be characterized by the following dimensions: outer diameter, $D_o$, inner diameter, $d_e$, height, $H_e$, and wall thickness, $t_e$. As compliant wall 54 expands and stretches in height, thickness of compliant wall 54 decreases in the radial direction from $t_o$ to $t_e$. Thickness changes may occur for any compliant wall or segment for a combustion device described herein and not just the illustrative example shown in FIGS. 13A and 13B.

In one embodiment, thickness for a compliant wall—or portion of a compliant wall—decreases by more than about 1 millimeter as a result of stretching due to combustion. Some combustion devices may include a compliant wall or wall portion that decreases in thickness by more than about 2 millimeters. In a specific embodiment, thickness for a compliant wall—or portion thereof—decreases by more than about 5 millimeters as a result of combustion. The degree of thickness change may also be characterized relative to initial dimensions of the compliant wall. In one embodiment, thickness for a portion of a compliant wall decreases by more than about 20% of an original thickness for the portion before combustion. In a specific embodiment, the compliant wall decreases by more than about 40% of an original thickness for the portion before combustion. It is understood that some portions of a compliant wall may thin more than other portions. For example, combustion device 70 of FIG. 3C includes a cylindrical compliant wall 74 whose thickness varies along axial direction 85. In this case, thickness is at a minimum in a central portion of the compliant wall 74 and increases towards end plates 72.

Combustion chamber volumes may also be configured to increase as a result of a thickness decrease in a compliant wall—or compliant segment. Referring again to FIGS. 13A-13B for example, as thickness of compliant wall 54 decreases in the radial direction from $t_o$ to $t_e$ the inner diameter of compliant wall 54 increases from $d_o$ to $d_e$. Outer diameter, $D_o$, remains relatively constant due to constraints 58, which limit radial expansion of the outer surface of compliant wall 54. Thus, the inner diameter—and volume—of the combustion chamber dynamically increases during combustion.

In an illustrative example, $t_o$ starts at about 1 cm, $d_o$ starts at about 2 cm ($D_o$ will stay relatively constant at about 4 cm), and $H_o$ starts at about 2 cm. After combustion, compliant wall 54 includes a combustion device 50 is configured such that $t_o$ drops to about 0.4 cm, $d_e$ peaks at about 2.8 cm and $H_e$ peaks at about 5.5 cm. This results in a volume increase of about 5 times the initial volume. For a conventional cylinder where wall thickness or internal diameter does not change, the same change in height for the device only produces a volume increase of about 2.75 times the initial volume.

As one of skill in the art will appreciate, increasing maximum volume for a combustion chamber increases the engine displacement. The displacement provides an indication of how much energy per firing a combustion device can produce. As displacement increases, so does energy available to a combustion device for one firing. For example, larger displacement increases energy and efficiency since more fuel may be burned during each combustion or cycle and a larger combustion volume for a given surface area reduces thermal losses. This dynamic combustion chamber increase is not limited to the example of FIG. 13 and may include any device describer herein or any compliant walled combustion device of the present invention.

Combustion chamber dimensions may be configured to take advantage of decreasing wall thicknesses and dynamic combustion chamber volume increases. In one embodiment, a combustion chamber is configured such that the diameter for a substantially cylindrical combustion chamber increases during combustion of the fuel. For the cylindrical embodiments, this occurs as a result of maintaining a substantially fixed outer diameter for the combustion chamber walls during expansion of the chamber. When expansion occurs, the thickness of the cylindrical chamber walls decrease, which causes a corresponding double increase in the inner diameter of the chamber. Since volume of a cylinder increases with the square of the radius change, increasing dynamic diameters may result in significant displacement improvement for a combustion device (e.g., for a radius increase from 1 cm to 1.5 cm, the planar area and thus the cylindrical volume for a chamber having a fixed height increases by a factor of 2.25 (i.e., $1.5^2$)). Changes in the height (or length) of the cylindrical combustion chamber amplify this dynamic diameter gain. If the height of the cylindrical combustion chamber doubles for the previous example, then the volume increases by a factor of 4.5

(2×2.25). This is a significantly larger increase in volume than just a linear expansion alone. A conventional rigid walled combustion device would only increase in volume by a factor of 2 for the same doubling in height and no change in inner diameter.

The amount of volumetric increase based on reduced wall thicknesses during combustion will depend upon the thickness of any compliant walls included in the combustion device and configuration for the combustion device. Some combustion devices include relatively thick combustion chamber walls that provide significant opportunity for wall thinning and volumetric increase. Configuration also affects the volumetric increase. In some embodiments, a combustion device of the present invention may include a greater initial outer diameter that an initial height ($D_o>H_o$) to capitalize the square of radius changes. In another embodiment, the combustion chamber is spherical (see FIGS. 8 and 9) and the volume increases with the cube of a thickness decrease and corresponding radius increase.

There are many ways to characterize dynamic volumetric changes for a combustion device of the present invention. For a cylindrical or spherical combustion chamber, changes in inner diameter for the chamber provide a good indication of volumetric increase benefits based on a decreasing wall thickness. Inner diameter changes will vary with the size of the combustion device, the thickness and elastic properties of the walls, the amount of fuel consumed in a combustion, etc. In one embodiment, inner diameter for a combustion chamber increases by more than about 2 millimeters during combustion of the fuel in the combustion chamber. Some combustion chambers may include an inner diameter that increases by more than about 4 millimeters. In a specific embodiment, inner diameter for a combustion chamber increases by more than about 10 millimeters as a result of combustion. The degree of change may also be characterized relative to initial dimensions for the inner diameter. In one embodiment, inner diameter of the combustion chamber increases by more than about 10% relative to an inner diameter for the combustion chamber before combustion. In a specific embodiment, the inner diameter increases by more than about 20% relative to the original inner diameter. It is understood that some portions of a combustion chamber may increase in inner diameter more than other portions (see FIG. 3C for example).

Other combustion devices and designs described herein may be configured to include wall thicknesses that decrease with combustion. Many of these devices may also witness dynamic volumetric increases based on changing wall thicknesses. For example, combustion device 120 of FIG. 5A may be configured with compliant walls 122 that decrease in thickness and increase volume of combustion chamber 132 during combustion. Similarly, the spherical wall 182 of combustion chamber 180 of FIG. 8A may be configured with thick wall that diminishes in thickness during combustion and increase volume of chamber 184.

In one aspect, the present invention relates to methods for using combustion devices. Since compliant walled combustion devices offer new designs that are quite different from conventional rigid-walled piston designs, the present invention opens up new regimes in combustion device operation. One method decreases thickness of a wall during deflection. Another method increases volume of a combustion chamber dynamically in multiple directions or as a wall changes in thickness. The present invention also enables new combustion cycles. One cycle uses elastic energy stored in a stretching wall to facilitate exhaust. The present invention also improves mechanical/electrical hybrid systems, which will be described in further detail below.

Figure 14A:
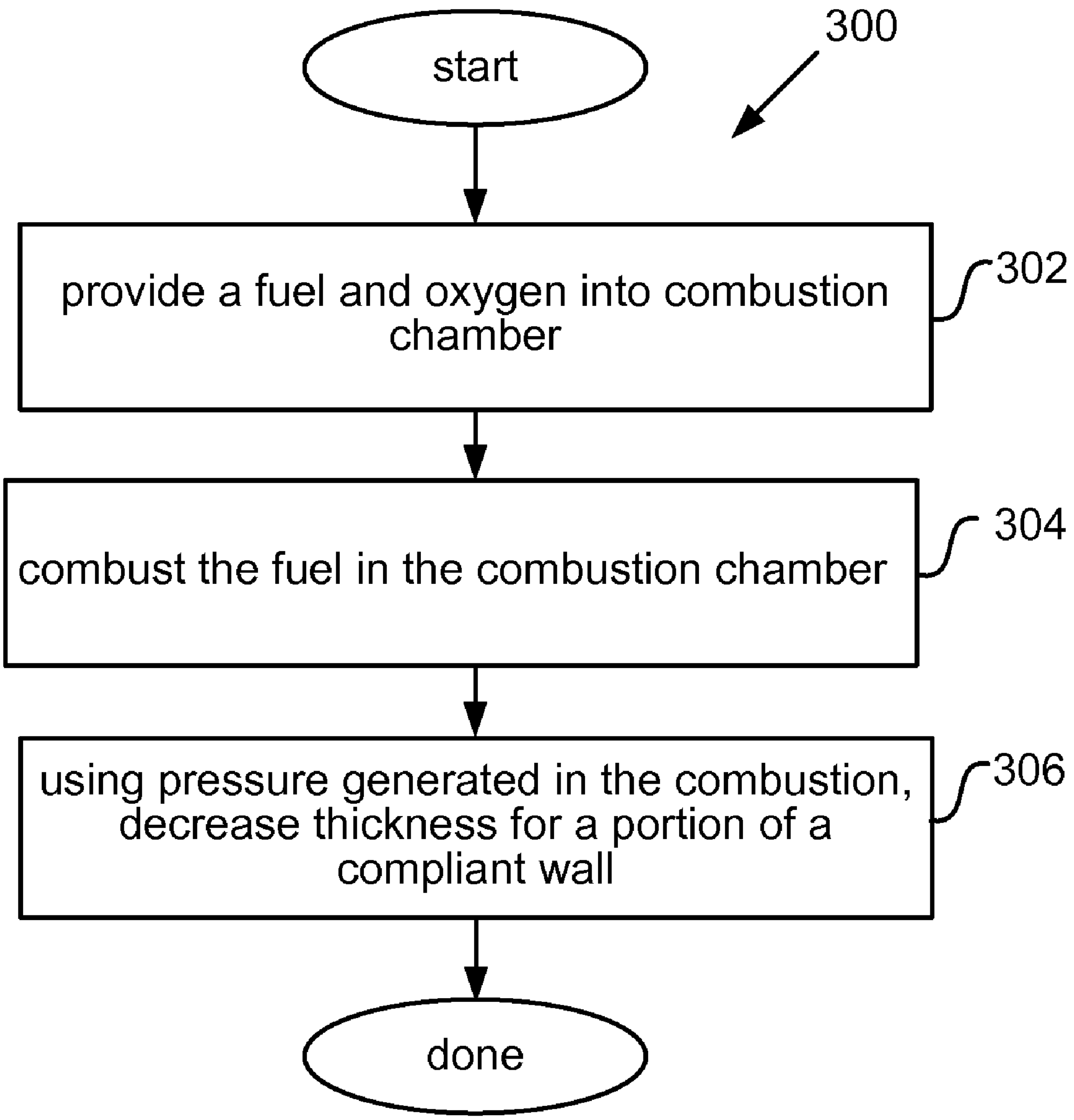
FIG. 14A illustrates a process flow for producing mechanical energy from a fuel in accordance with one embodiment of the present invention.

FIG. 14A illustrates a process flow 300 for producing mechanical energy from a fuel in accordance with one embodiment of the present invention. Other combustion devices and figures described herein may also help illustrate combustion methods described herein.

Process flow 300 begins by providing a fuel and oxygen into a combustion chamber (302). Typically this employs an inlet port or valve that opens into the combustion chamber and pressure to move the fuel and oxygen. A fuel system may supply the fuel and mix it with air so that a desired air/fuel mixture travels through the inlet port. Three common fuel delivery techniques include: carburetion, port fuel injection, and direct fuel injection. In carburetion, a carburetor mixes fuel (typically in a gaseous state) into air before provision into the combustion chamber. In a fuel-injected engine, a desired amount of fuel is injected into the combustion chamber either above the intake valve (port fuel injection) or directly into the chamber (direct fuel injection).

The fuel is then combusted in the combustion chamber (304). Typically, this occurs after the intake valve has been closed and while an exhaust port is also closed. In one embodiment, the present invention employs ignition to initiate combustion. This may occur with or without compression of the fuel/air mixture before ignition. In another embodiment, the present invention does not rely on ignition from an external device. Instead, heat and pressure of a compression stroke cause the fuel to spontaneously ignite. Compression devices compress the air/fuel mixture more, which may lead to increased efficiency. Further discussion of combustion and different combustion cycles suitable for use with a device of the present invention is provided below.

Process flow 300 proceeds by decreasing thickness (306) for a portion of a compliant wall such that volume for the combustion chamber increases with the thickness decrease. Typically, thickness changes in a compliant wall employ pressure and forces generated during combustion. In one embodiment, a compliant wall stretches in a direction that is substantially orthogonal to a direction of the thickness decrease. The combustion device may be constrained and prevented from moving in all directions save an intended direction of stretch, which then influences where and how the thickness change will occur.

The sizes of the combustion chambers formed in accordance with the present invention may be widely varied. By way of example, maximum combustion chamber volumes, after combustion, ranging from about 2 cubic centimeters to about 40 cubic centimeters work well. Other maximum combustion chamber volumes may be used. Combustion chamber volume may be varied according to the needs of an application. Since the polymer components and described systems can be quite small and light weight, engines incorporating the described combustion chambers are very well suited for use in relatively lower power requirement applications, including applications that do not traditionally use internal combustion engines as the power sources. By way of example, maximum combustion chamber volumes ranging from about 2 cubic centimeters to about 25 cubic centimeters work well in many applications. However, again, it should be appreciated that both larger and smaller combustion chamber volumes may also be used.

Changing wall thickness may also have other benefits. In many cases, the inner surface area of the combustion chamber increases with decreasing wall thickness and as the compliant wall stretches. This increases the surface area for heat dissipation from the combustion chamber, which may increase efficiency for the combustion device over a large number of cycles where steady-state heat dissipation affects efficiency.

Figure 14B:
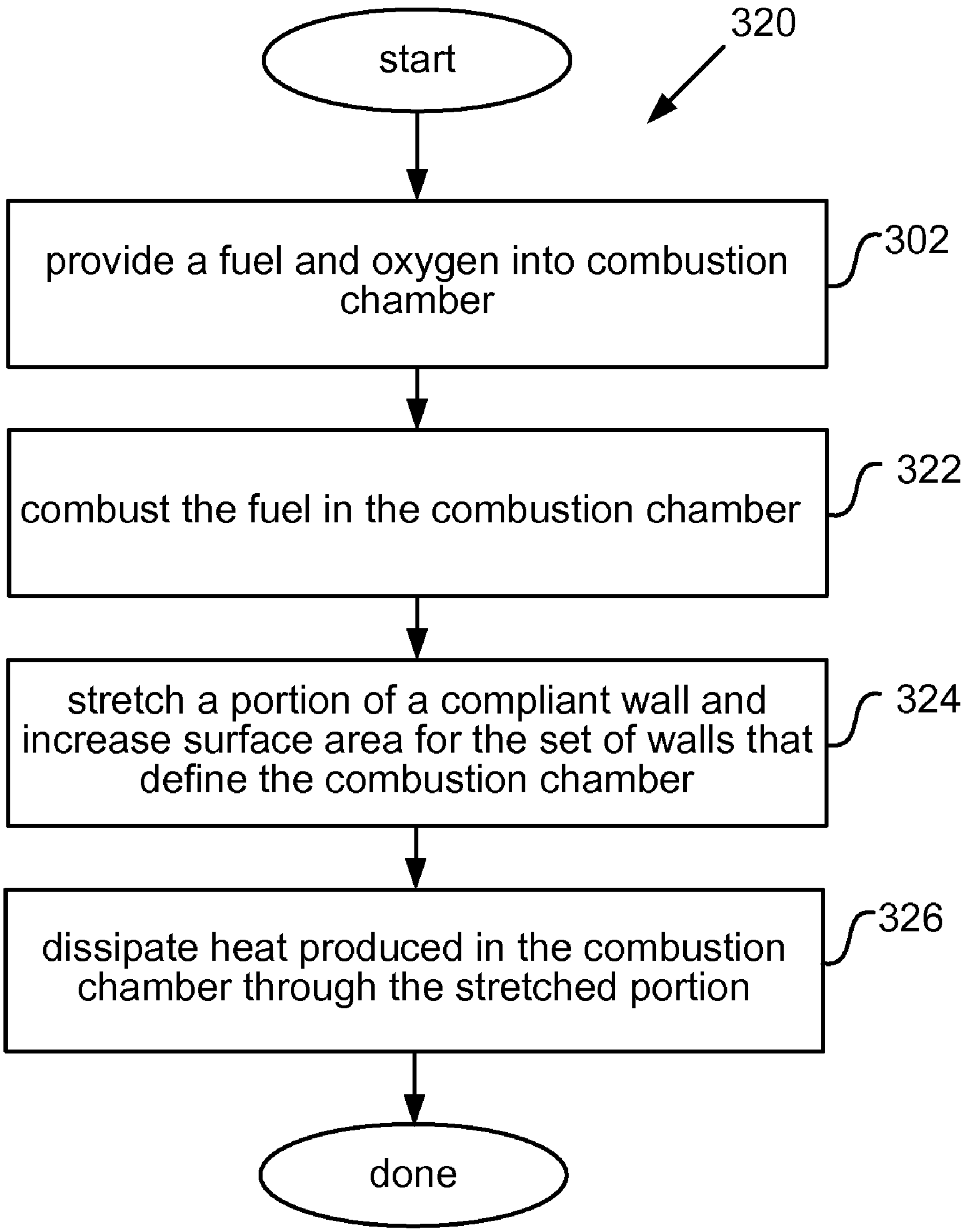
FIG. 14B illustrates a process flow for improving thermal management of a combustion device in accordance with one embodiment of the present invention.

For example, a cylindrical combustion chamber has a surface area proportional to the inner diameter and height. As the inner diameter increases with decreasing thickness, so does surface area for heat dissipation. A spherical combustion chamber will increase in inner surface area with the square of the inner radius and which depends on thickness changes. FIG. 14B illustrates a process flow 320 for improving thermal management of a combustion device in accordance with one embodiment of the present invention.

Process flow 320 provides fuel and oxygen into a combustion chamber, e.g., similar to that described above with respect to step 302 in process flow 300. The fuel is then burned to produce heat in the combustion chamber to produce heat (322).

Process flow 320 then stretches a compliant segment or wall included in a set of walls that border the combustion chamber such that surface area for the set of walls increases (324). For cylindrical combustion devices and compliant walls described above, the surface area bounding the combustion chamber will increase with both diameter and height increases. The amount of surface area increase will vary with design of the combustion chamber and device, elasticity and thickness of the compliant wall, and any load coupled to the mechanical output.

A unique feature of the present invention is that compliant wall thicknesses and inner diameters for a combustion chamber dynamically change during combustion. In one embodiment, the compliant wall includes a first thickness when combustion begins and a reduced thickness when combustion ends. This may be doubly beneficial for combustion. First, the compliant wall includes a greater thickness at the beginning of combustion—when heat should be contained to maximize mechanical output of the combustion device (and increase efficiency of a single combustion). Second, and oppositely, surface area for the combustion chamber also maximizes at the end of a stroke. This produces a greater area for thermal transfer out through the walls—when is often desirable for heat to be released from the combustion chamber. A compliant segment or wall that stretches or otherwise thins also includes a reduced thickness at the end of combustion. This reduces the thermal outlet path or cooling distance for dissipating heat from the combustion chamber through the compliant walls, again, when it is desirable to dissipate heat out from the combustion chamber at the end of the stroke. This reduced thermal path will also facilitate and expedite cooling of internal walls for the combustion chamber. Thus, the compliant segment or wall is thick when heat should be contained and thin and larger in surface area when heat should be dissipated. It is understood that thickness changes may vary across different portions of a compliant wall, thus altering thermal performance of the compliant wall as a function of position and configuration for the device.

Heat produced in the combustion chamber is then dissipated through the stretched compliant segment (326). Typically, this will occur as long as the temperature within the combustion chamber is greater than the temperature outside the combustion chamber. The heat may come from a current combustion or heat generated by previous combustion in the chamber.

In some designs, such as those that use a bending mode (e.g. a bellows) to respond to compression pressures, then the surface area doesn't significantly increase. For a bellows, the inner surface area of the folds stays the same, but as they unfold from axial expansion, the inner volume increases. These designs will also not see a significant decrease or change in thickness as described in process flow 300.

Combustion

The present invention contemplates a wide array of internal combustion engine designs and cycles it is not limited to any particular design or cycle. One well-known combustion cycle suitable for use with the present invention is the four-stroke combustion cycle, or Otto cycle. The Otto cycle includes four strokes: an intake stroke, a compression stroke, a combustion stroke, and an exhaust stroke. Such a four-stroke cycle is suitable for use with many combustion devices described above. Other suitable cycles include Miller, Diesel, Sterling, detonation (knock) cycles and various 2-stroke cycles. The Miller cycle is attractive in terms of its performance and natural fit to a compliant combustion device with electrical loading ability (such as using an electroactive polymer in conjunction with a combustion device) to effectively implement different compression and expansion strokes. In some cases, a crankshaft is used and piston-based cylinders are replaced with piston-less compliant combustion devices that expand uniaxially like conventional piston-based cylinders (see FIG. 16). Combustion devices of the present invention are also well suited for use with cycles and at high speeds.

Figure 15A:
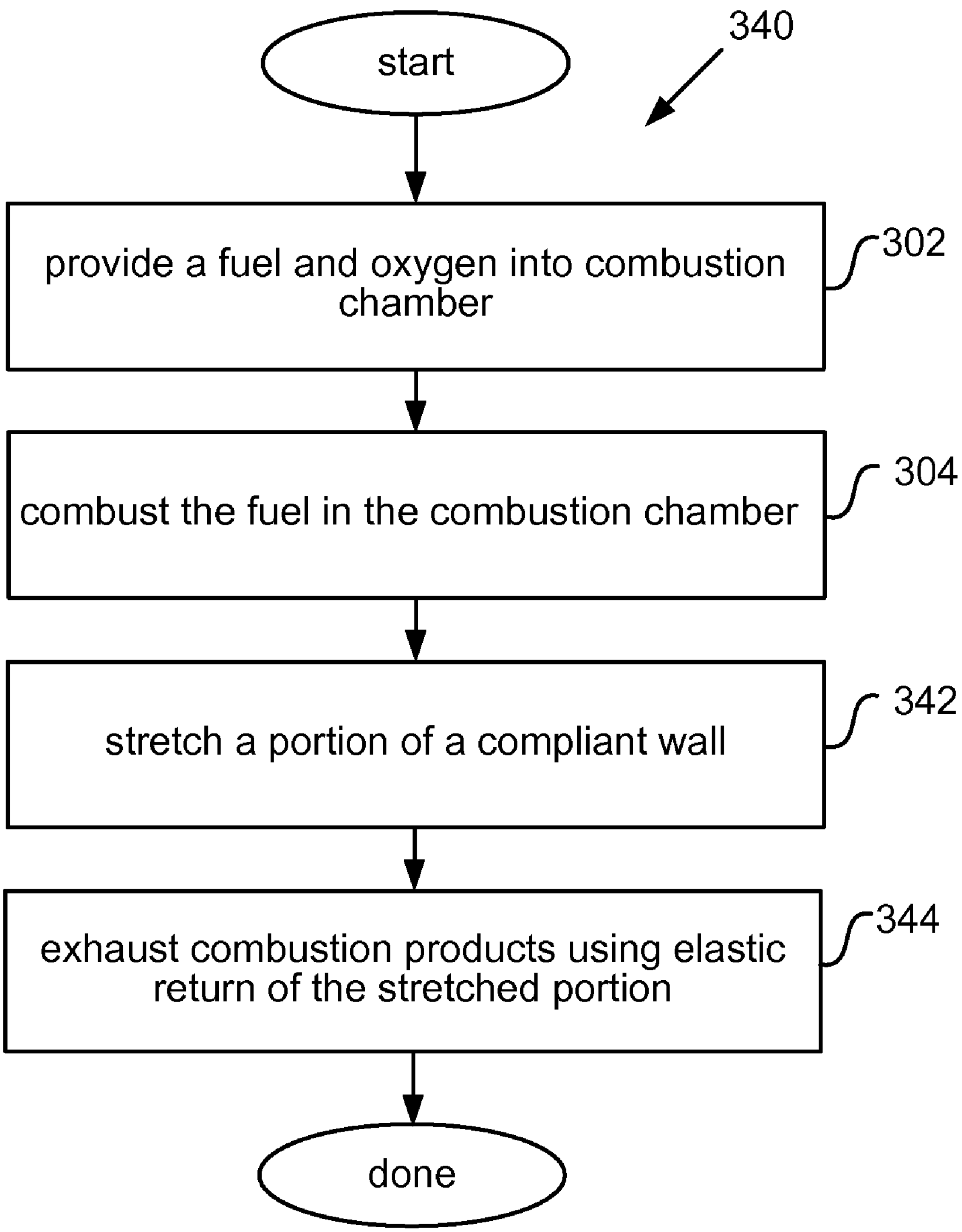
FIG. 15A illustrates a combustion cycle for producing mechanical energy from a fuel in accordance with one embodiment of the present invention.

Unique features provided by the present invention may also create new combustion cycles and alter conventional combustion cycles. FIG. 15A illustrates a combustion cycle 340 for producing mechanical energy from a fuel in accordance with one embodiment of the present invention.

Process flow 340 provides fuel and oxygen into a combustion chamber (302). The fuel is then burned in the combustion chamber to produce heat (304). A compliant segment or wall is then stretched in response to the combustion (342). The compliant segment is included in a set of walls that border the combustion chamber. The compliant wall receives mechanical energy from the combustion and stores a portion of the mechanical energy as elastic energy. As will be described in further detail below, a constraint may influence deformation of the compliant wall and force it along a desired direction of output. Some constraints, such as a helical spring, may also store mechanical energy provided in the combustion as it deforms.

After combustion is complete, combustion products are exhausted from the combustion chamber using elastic return of the stretched portion (344). More specifically, elastic energy stored in the compliant wall returns the compliant wall to position that reduces volume in the combustion chamber. Typically, an exhaust port is opened just before elastic return begins. The amount of force available in the compliant wall for expelling exhaust from the combustion chamber will depend on the amount of force produced during the combustion, elastic properties of compliant wall, and the ratio of mechanical energy provided to the compliant wall relative to that provided to a mechanical output or load. A helical spring used as a constraint may also assist elastic return and exhaust of combustion products. In this manner, elastic return of the compliant wall provides a mechanism for automatically and passively exhausting combustion gases from a chamber after combustion.

Compression ratio is a basic efficiency parameter for many combustion devices. Compression ratios of 6-12 are typical for Otto cycles. Higher compression ratios can theoretically deliver higher efficiency, but detonation (knock), which adversely affects engine lifetime, typically limits the use of high compression ratios in conventional engines. Many compliant walled combustion devices may offer advantages for knock engines because of their shock resistance and compact configuration. Compression ratios of 6-12 are feasible using any one of a number of different compliant combustion device configurations. One may use dormant spacers 82 (FIG. 3A) if needed to reduce the top dead center volume (minimum chamber volume) and increase the compression ratio. Thus, compression ratios greater than 6-12 may be used with devices described herein.

Relative to conventional metal combustion devices, some compliant walled combustion devices described herein reduce surface-to-volume ratios at a given volume, operate at higher inner wall temperatures than oil-lubricated metal engines, eliminate piston-cylinder leakage and mechanical friction in from piston-cylinder sliding contact, reduce heat transfer to the inner wall by expanding the chamber with the combustion gases rather than having a relative velocity between the two, and (if desired, using an electroactive polymer or other electrical device or control) adjust timing and pressure variables at electronic speeds. Any of these may improve combustion and conversion of chemical energy in the fuel to useful mechanical energy.

Hybrid Electrical Energy Functionality

The present invention also permits electrical energy generation using combustive energy. In one embodiment, an electroactive polymer transducer is used to generate electrical energy based on mechanical energy provided by combustion. Electroactive polymers are a class of compliant polymers whose electrical state changes with deformation. Exemplary electroactive polymers may include electrostrictive polymers, dielectric elastomers (a.k.a. electroelastomers), conducting polymers, IPMC, gels, etc. In a specific embodiment, a compliant wall included in a combustion device includes a composite structure that includes a compliant wall as described herein for enclosing a combustion chamber and an electroactive polymer transducer disposed external to the compliant wall.

Some electroactive polymers are multifunctional, so the same electroactive polymer transducer can be used a) as a generator (convert mechanical to electrical energy, e.g., to power a spark plug), b) as an actuator (convert electrical energy to mechanical energy, e.g., in a "turbo" mode where mechanical output of the device is increased by using both electrical actuation and a combustion drive working together), and/or c) as a sensor (read electrical changes, e.g., to detect deformation). The sensing function may also be used to monitor and optimize combustion or other polymer engine parameters. Sensing could be used to monitor mechanical loading conditions of interest. For electrical energy generation, the combustion is used to deform or stretch the electroactive polymer in some manner.

Figure 15B:
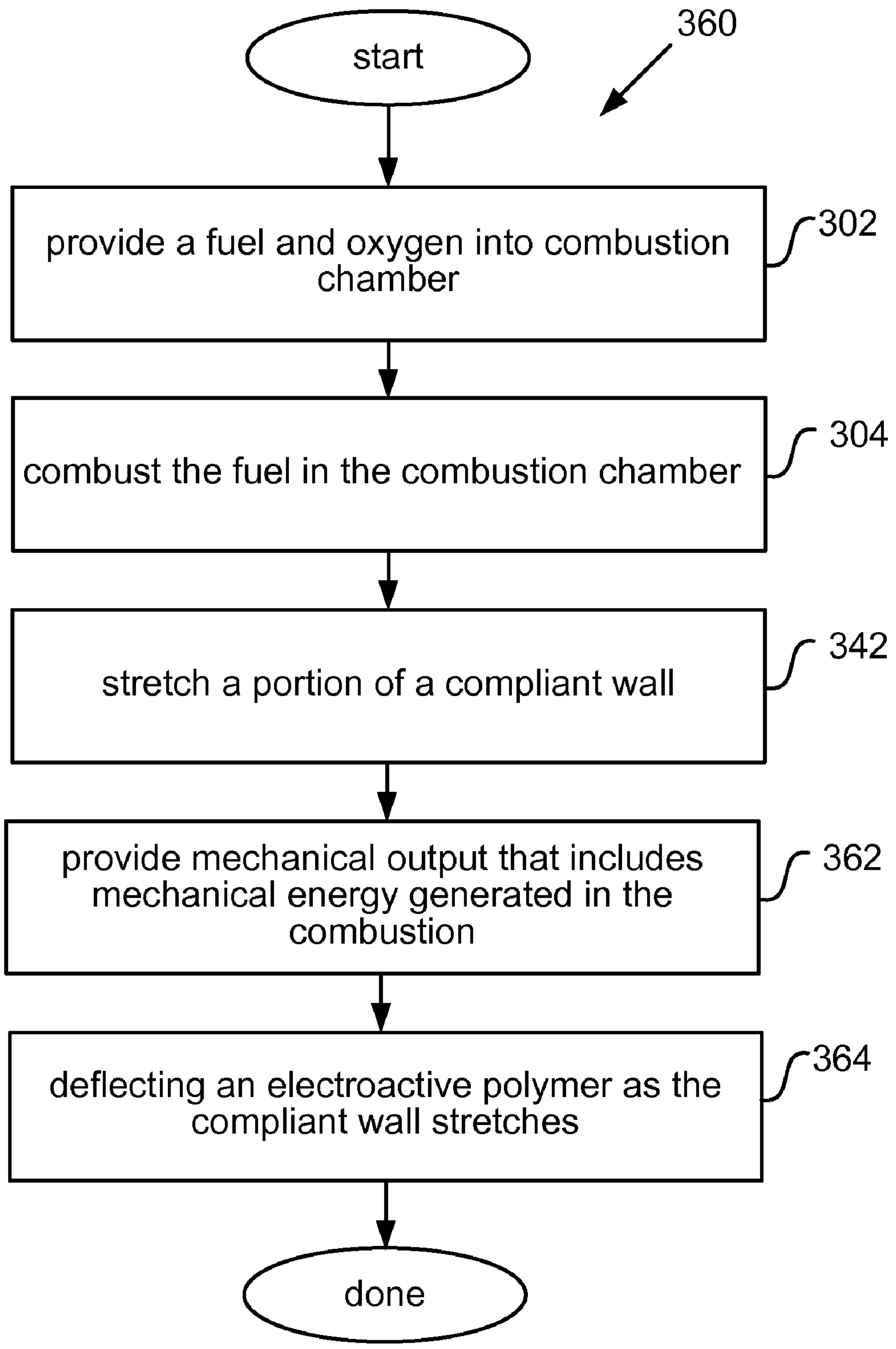
FIG. 15B illustrates a process flow for producing mechanical energy from a fuel in accordance with another embodiment of the present invention.

The present invention also permits new hybrid mechanical and electrical output systems and methods. FIG. 15B illustrates a process flow 360 for producing mechanical energy from a fuel in accordance with one embodiment of the present invention.

Process flow 360 provides fuel and oxygen into a combustion chamber (302). The fuel is then combusted to produce heat in the combustion chamber (304). A compliant segment or compliant wall is then stretched (342). The compliant segment or wall is included in a set of walls that define the combustion chamber.

Mechanical energy produced in the combustion is then provided for mechanical output (362). For example, a mechanical output coupled to the combustion chamber may be used to do work on a load. In a robotics application, the mechanical output may be used for locomotion.

Process flow 360 also deforms an electroactive polymer as the compliant segment or wall stretches (364). The compliant segment of the wall may itself by made of an electroactive polymer. The electroactive polymer may be used to assist mechanical output, intake or compress fuel-air mixture, alter mechanical output via electrical loading, as a sensor, and/or to generate electrical energy. Actuating the polymer—or applying an electric field to the electroactive polymer during combustion—may increase the amount of mechanical output for the combustion device. Applying an electric field to the electroactive polymer before the electroactive polymer contracts from a stretched position may be used to generate electrical energy using the electroactive polymer as it contracts from the stretched position. Applying an electric field to the electroactive polymer before combustion is complete may alter the electroactive polymer stiffness, which alters mechanical load on the hybrid device and effects combustion efficiency. This allows combustion device controllers and designers to dynamically and electrically tailor combustion output. Alternatively, the electroactive polymer may be used as a sensor where an electrical state of the electroactive polymer is read as compliant segment or wall deforms. Electroactive polymers may also be used as an actuator to intake fuel-air mixtures into the combustion chamber, or to force exhaust gases out after combustion.

In a specific embodiment, the electroactive polymer attaches or couples to compliant segment or wall, such as the outer surface, and stretches with the compliant segment or wall. For example, an electroactive polymer may be wrapped once or rolled multiple times around compliant cylindrical wall 54 of combustion device 50 in FIG. 2A. For electrical energy generation with some electroactive polymers, charge is placed on compliant electrodes attached to an electroactive polymer at some elevated planar expansion. When the electroactive polymer contracts, positive charges on one face of the polymer are pushed farther away from the negative charges on the opposite face of the polymer, thus raising their voltage and electrical energy. In addition, as the electroactive polymer contracts, charges on each face (positive charges on a electrode and face or negative charges on a second electrode) become closer and raise voltage and electrical energy of any charge on the electrodes. Gains in contracted energy of 3-5 times the energy initially placed on the polymer are common, with smaller and greater gains possible, depending on the area strain of the stretched electroactive polymer, loading conditions and electrical harvesting controls.

To generate electrical energy over an extended time period, the electroactive polymer may be stretched and relaxed over many cycles. For electrical energy harvesting from a combustion device, mechanical energy from combustion is applied to the electroactive polymer in a manner that allows electrical energy to be removed from the electroactive polymer. Generation and utilization of electrical energy may require conditioning electronics of some type. For instance, circuitry may be used to remove electrical energy from the transducer. Further, circuitry may be used to increase the efficiency or quantity of electrical generation or to convert an output voltage to a more suitable value. Further discussion of conditioning electronics suitable for use with the present invention is described in commonly owned U.S. Pat. No. 6,628,040 and entitled "Electroactive Polymer Thermal Electric Generator" naming R. Pelrine et al. as inventors. This application is incorporated herein by reference in its entirety for all purposes.

In another specific embodiment, a compliant wall for the combustion device includes an electroactive polymer that is actuated to intake combustion chamber reactants or exhaust combustion chamber products. For intake, the electroactive polymer compliant wall is actuated to increase combustion chamber volume (e.g., elongate the chamber), create a negative pressure, and draw in fuel and/or air. Electrical energy to the electroactive polymer may then be turned off to compress the fuel before ignition via elastic return of the polymer. The electroactive polymer offers a simple alternative to draw in fuel and air without requiring a pressurized source or a camshaft that actuates the valves in a piston-cylinder engine. For example, wall 244 of combustion device 240 (FIG. 12A) may include an electroactive polymer. In this case, the electroactive polymer is being used in actuator mode to perform fuel control functions. In other embodiments, charge can be reapplied to an electroactive polymer at top dead center to oppose contraction forces momentarily. Further, charge can be reapplied to the electroactive polymer at top dead center if running the electroactive polymer in generator mode.

Conventional engines basically execute a sinusoidal motion of the piston (sinusoidal displacement relative to time); a necessity imposed by the inertia of the device and crankshaft motion constraints in a conventional engine. Compliant walled combustion devices that include an electroactive polymer may execute more advanced motions and are not limited to sinusoidal output. Loading can be electronically varied in a conventional engine generator but only in a gross, average way by electronically loading the external generator. Motion or frequency (e.g., in a free piston engine) constraints in conventional engines may also cause suboptimal performance. For example, it is well known that the ideal Sterling cycle is a reversible cycle theoretically capable of Carnot efficiency. But practical implementations of Sterling engines usually only approximate the ideal Sterling cycle because they cannot execute discontinuous, independent motions of the hot and cold sides of the engine (the two are typically mechanically coupled by a crankshaft, for example, in a conventional design).

By contrast, an electroactive polymer and compliant walled combustion device could, for example, be controlled to expand rapidly, completely stop for a significant part of the cycle period, and then slowly contract (by varying an electrical state applied onto the electroactive polymer that increases stiffness of the electroactive polymer or mechanical force applied by the electroactive polymer). The pressure profile in the polymer engine could even be adjusted electronically on the fly, for example in response to startup conditions, changes in load, changes in environmental conditions, or changes in sensed combustion parameters. The ability to electronically change control parameters generally leads to improved combustion and systems. Further description of electroactive polymers suitable for use with the present invention is described in commonly owned U.S. Pat. No. 6,628,040, which is incorporated herein by reference in its entirety for all purposes.

Materials suitable for use as an electroactive polymer with the present invention may include any substantially insulating polymer or rubber (or combination thereof) that deforms in response to an electrostatic force or whose deformation results in a change in electric field. One suitable material is NuSil CF19-2186 as provided by NuSil Technology of Carpenteria, Calif. Other exemplary materials suitable for use as a pre-strained polymer include silicone elastomers, acrylic elastomers such as VHB 4910 acrylic elastomer as produced by 3M Corporation of St. Paul, Minn.

Applications

The present invention finds wide use. Compliant walled combustion devices described herein may be used in any application that traditionally employs conventional piston-based engines. For example, combustion devices of the present invention may be used in lawnmowers, leaf blowers, pumps, compressors, and other tools and equipment. Combustion devices described herein also find wide use as a fast acting actuator. Locomotion applications may include automotive applications where mechanical and/or electrical power is generated from a fuel.

Compliant walled combustion devices encompass a large design space, even larger than piston-cylinder engines because of their greater design flexibility. Further, existing limitations in piston-cylinder engine designs, particularly on small scales, are overcome using compliant walled combustion devices.

Although the present invention has primarily been described with respect to mechanical output of a single combustion device, many systems have more than one combustion device. Four, six and eight cylinder systems are common. Multiple cylinders may be arranged in a number of ways: in-line, V, or flat (also known as horizontally opposed or boxer).

The Department of Defense (DoD) has diverse needs for power sources ranging from micro air vehicles (MAVs) and small autonomous robots to portable power sources for foot soldiers to large power sources for vehicles and spacecraft. Most DoD power sources are designed for mobile applications, and many therefore have common requirements such as lightweight, high efficiency, and high power density. The present invention is well suited for use in these applications. Combustion devices described herein also find use for small, lightweight, efficient 20 W power sources for various generic missions. In particular, the MAV (micro air vehicle) and small robot missions where power output, longevity and weight are important may benefit from the present invention.

The present invention provides a portable energy alternative with a high power to weight ratio and the ability to generate power over a significant time period. Hydrocarbon based fuels have a relatively high energy density as compared to batteries. For instance, the energy density of a hydrocarbon based fuel may be 20 times higher than a density of a battery.

Compliant combustion engines described herein are also easily adapted to include electrical energy generation. Adding an electroactive polymer that produces electrical energy from combustion also increases applicability of the present invention. Many applications require both mechanical and electrical power. Robotics often requires mechanical output in addition to electrical energy generation. Some compliant engines may electronically control the ratio of the two—which is useful for robots and mobile applications. In contrast, robotics devices that employ fuel cells and batteries also an entire separate subsystem (e.g., a motor) to produce mechanical output. Relative to conventional piston-based combustion devices, an entire subsystem—the electromagnetic generator—has been eliminated.

In one embodiment, electrical input using an electroactive polymer is used to alter the combustion loading (i.e., the combustion pressure-volume profile) electronically in real time. The idea of using electrical loading on a generator to optimize the combustion efficiency of an engine has been applied to hybrid cars. However, with compliant walled combustion engines loading can be controlled more quickly—potentially within much less than the period of one cycle.

Using polymers for compliant walls may also lower costs of combustion devices described herein since polymers are generally less expensive than metals. Embodiments that do not include metal components may also avoid the need for precision machining of metals and associated costs thereof. In some cases, combustion devices of the present invention are inexpensive enough to be made as a disposable item if desired.

The present invention may include low cost polymers in construction. This permits the possibility of disposable engines. Custom molding of polymers also allows a designer to fabricate a variety of combustion volume shapes (e.g. oval, flatter, etc.) and customize a device in shape for a particular application.

The polymers also provide mass advantages as lightweight materials, e.g., higher power density per gram, or, for a given engine mass, the ability to make a larger combustion volume which typically increases efficiency. The invention also reduces extra mass needed to maintain rigidity in the tight tolerances of conventional metal piston-cylinders.

Also, the present invention opens the option of using dirty fuels because tight sliding seals have been eliminated from inside the combustion chamber.

The compliant wall approach offers numerous potential advantages such as light weight, quiet, simplicity, high efficiency, an ability to electronically vary between electrical and mechanical outputs to optimize the system, low cost, and tremendous design flexibility. Many compliant combustion devices and engines described herein simplify combustion device technology. Much of the conventional rigid engine hardware may be eliminated such as pistons, piston rings and lubricants in piston designs.

The piston rings in a conventional engine provide a sliding seal between the outer edge of the piston and the inner edge of the cylinder. The rings serve two purposes: they provide the fuel/air mixture and exhaust in the combustion chamber from leaking during compression in combustion; and keep oil from leaking into the combustion chamber, where would be burned and lost. Since the present invention need not include a piston internal to the combustion chamber, piston rings internal to the combustion chamber may be avoided. Also eliminated in this case are combustion chamber leakage issues associated with piston rings.

The present invention also offers light weight, low noise signature (quiet operation), simplicity and improved efficiency designs. The low inertia of polymer components enables higher efficiency than that of metal components. Light weight not only reduces power plant weight but also increases efficiency. Each time the combustion device changes direction, it uses energy to stop travel in one direction and start travel in another. The lighter the combustion device, the less energy changing directions takes. The potential for higher wall temperatures than in oil-lubricated engines is also an opportunity for increased efficiency.

A noteworthy design feature of many combustion devices described herein, such as devices 180 and 200, is that the combustion chamber 184 is isolated from any mechanical moving parts, such as between outer surfaces or seals included in piston 206 and the inner surface of housing 204. As a result, any lubrication used for minimizing friction between piston 206 and housing 204 need not mix with any components in combustion chamber 184 and need not be subject to the high temperature conditions that are found inside combustion chambers.

Compliant combustion devices claimed herein may also achieve attractive power densities at sub-acoustic frequencies, eliminate other noise sources such as metal-to-metal contact in gears and bearings.

Combustion Devices

Having discussed compliant walled combustion devices independent of design, several benefits and various modes of operation, numerous exemplary designs will now be expanded upon.

Figure 2A:
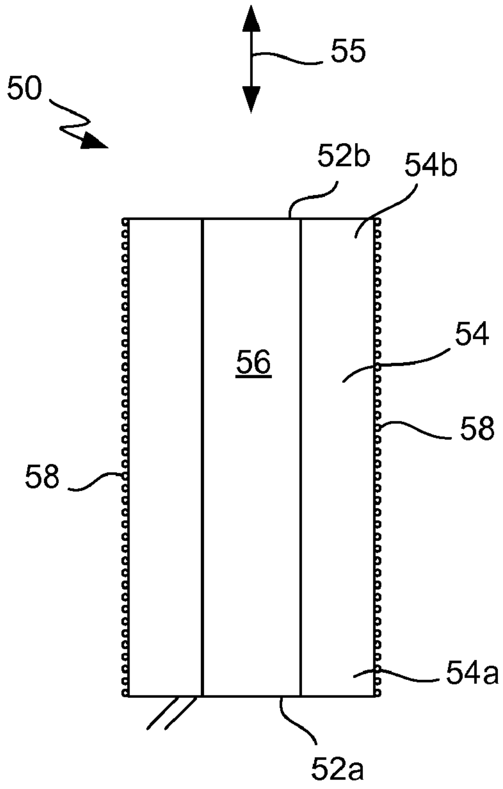
FIG. 2A illustrates a simplified cross-section of a cylindrical combustion device, before combustion, in accordance with one embodiment of the present invention.
Figure 2B:
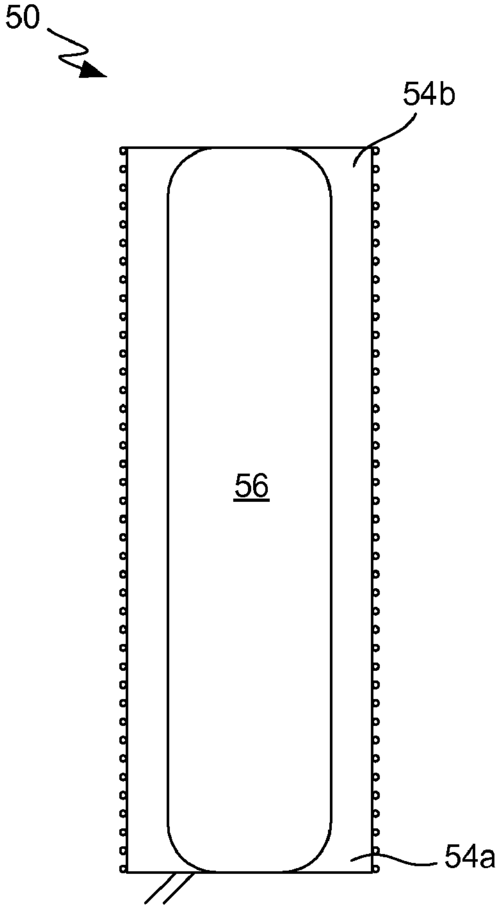
FIG. 2B illustrates the cylindrical combustion device of FIG. 2A after combustion.

FIG. 2A illustrates a simplified cross-section of a cylindrical combustion device 50, before combustion, in accordance with one embodiment of the present invention. FIG. 2B illustrates device 50 after combustion. Combustion device 50 includes rigid walls 52, compliant wall 54, combustion chamber 56 and constraint 58.

Compliant wall 54 is substantially cylindrical and circumferentially borders combustion chamber 56 along an axial length of chamber 56. Cylindrical wall 54 axially stretches in direction 55 in response to combustion of a fuel in combustion chamber 56. In one embodiment, thickness for wall 56 is substantially constant, before combustion in chamber 56, for the entire circumference taken through an axial cross-section of wall 54. In some cases, the thickness may vary during and after combustion. Cylindrical wall 54 includes a material whose elastic strength is low enough to permit axial stretching based on combustion in chamber 56. In a specific embodiment, compliant wall 54 includes a stretchable elastomer, such as silicone having a desired stiffness. Additional details on suitable compliant wall materials are elastic properties were provided above.

Rigid walls 52 resemble end caps on the substantially cylindrical compliant wall 54. Rigid wall 52*a* is disposed at a first end 54*a* of compliant wall 54, while rigid wall 52*b* is disposed at a second end 54*b* of compliant wall 54. Rigid wall 52*a* is externally fixed and remains relatively stationary during combustion within combustion chamber 56. Rigid wall 52*b* moves relative to rigid wall 52*a* in axial direction 55 as a result of combustion within combustion chamber 56 and stretching of compliant wall 54. While not shown in FIG. 2A, rigid walls 52 may include one or more coupling mechanisms to allow attachment to fixed or mechanical outputs. Compliant wall end portions 54*a* and 54*b* may attach to rigid walls 52*a* and 52*b*, respectively, using a suitable adhesive, for example.

Combustion chamber 56 is defined in size by the inner surfaces of rigid walls 52 and compliant wall 54. More specifically, a tubular inner surface of compliant wall 54 and substantially flat end portions of rigid walls 52 cooperate to form a substantially cylindrical volume for combustion chamber 56. While not shown in FIG. 2A, device 50 may also include one or more inlet and outlet ports to communicate reactant and product gases into and out of combustion chamber 56. Ignition and combustion of a fuel within chamber 56 increases pressure within chamber 56 and causes compliant wall 54 to axially stretch in direction 55.

Constraint 58 reduces radial expansion of the compliant wall 54 during combustion of the fuel in combustion chamber 56. In the absence of constraint 58, combustion and pressure generation within chamber 56 causes compliant wall 54 to deform and stretch a) radially away from a central cylindrical axis and b) linearly along direction 55. By reducing radial expansion of compliant wall 54, constraint 58 increases mechanical output efficiency in a desired output direction, such as direction 55 when rigid wall 52*a* is fixed.

In one embodiment, constraint 58 includes a high tensile element 58 that wraps circumferentially about the substantially cylindrical compliant wall 54. For example, the high tensile element may include one or more high tensile fibrous strands 58, such as Kevlar, a metal wire or a nylon fiber. The high tensile fibrous strands 58 prevent radial expansion of outer portions of compliant wall 54.

In a specific embodiment, high tensile fibrous strands 58 wrap around an outside surface of compliant wall 54. Alternatively, a high tensile element 58 may be integrated into the wall thickness of compliant wall 54. In this case, the high tensile fibrous strands are embedded in, such as halfway, between the inner surface of compliant wall 54 and the outer surface. In a specific embodiment, constraint 58 includes a coil (such as a spring) with flat windings (flattened normal to the direction of expansion and contraction) embedded in the structure of compliant wall 54. The flat windings resist vacuum formation within the compliant wall around each winding as the wall axially deforms. In another embodiment, the constraint 58 may be a set of disks or rings separated by spacers in a few locations. Using a silicone or other polymer for compliant wall 54 and a lightweight fiber such as Kevlar for constraint 58 provides a combustion device 50 that is significantly lighter than conventional metal piston-based combustion cylinders.

The amount and geometry of winding for the high tensile element between ends of compliant wall 54 in direction 55 may vary. In a specific embodiment, separate strands or high tensile elements 58 are included along the axial direction 55 of compliant wall 54. In this case, constraint 58 may include anywhere from two to dozens to several hundred individual strands, counted along the axial direction, that circumferentially surround combustion chamber 56. In another embodiment, a single high tensile element wraps helically about the substantially cylindrical compliant wall from one end 54*a* of compliant wall to the other end 54*b* (or to some lesser degree if the entire axial length of compliant wall 54 is not used for expansion, see FIG. 3A). In this case, the high tensile element may include a helical spring—such as a spring formed of a suitably stiff plastic or metal.

In many embodiments, such as high tensile fibrous strands wrapped around compliant wall 54, constraint 58 does not substantially inhibit axial deformation of the substantially cylindrical compliant wall 54 along direction 55. As mentioned above, by reducing radial expansion of compliant wall 54, constraint 58 increases mechanical output efficiency in direction 55 since pressure generated within combustion chamber 56 results primarily in expansion of endplate 54*b* axially in direction 55.

A helical spring used as constraint 58 restricts radial deformation of compliant wall 54. However, the spring will store elastic mechanical energy as the spring 58 and compliant wall 54 stretch in direction 55. This is useful in some designs. For example, elastic return of the spring and compliant wall 54 provides a mechanism for automatically and passively exhausting combustion gases from chamber 56 after combustion.

It is understood that the cylindrical shape of combustion chamber 56 may deviate from a perfect cylinder, particularly during combustion of a fuel within chamber 56. As described above, compliant wall 154 may decrease in thickness as it stretches in axial direction 55. As shown in FIG. 2B after combustion (or during combustion to a lesser degree), end portions 54*a* and 54*b* of compliant wall that attach to rigid walls 52*a* and 52*b* are restricted from axial stretching and radial thinning in this region. This rounds the cylindrical corners of combustion chamber 56. In addition, in the absence of constraint 58, compliant wall 56 may deform radially during combustion and initial rapid expansion of gases within chamber 56, and thus deviate from a perfect cylinder for the volume of chamber 56. Alternatively, chamber 56 may intentionally be made non-cylindrical even without combustion expansion; for example, chamber 56 may include a flat oval to better fit an application with flat constraints.

In a specific embodiment, constraint 58 includes a helical spring configured with a negative spring force when combustion device 50 is in a contracted state as shown in FIG. 2A. This increases linear output in axial direction 55. In some cases, this may also increase mechanical output and efficiency for combustion device 50 (where efficiency is defined as the ratio of mechanical output to chemical input).

Figure 3A:
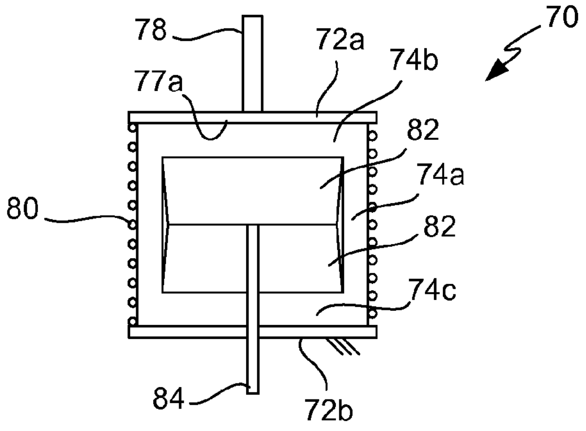
FIG. 3A illustrates a simplified cross-section of a cylindrical combustion device, before combustion, in accordance with one embodiment of the present invention.
Figure 3B:
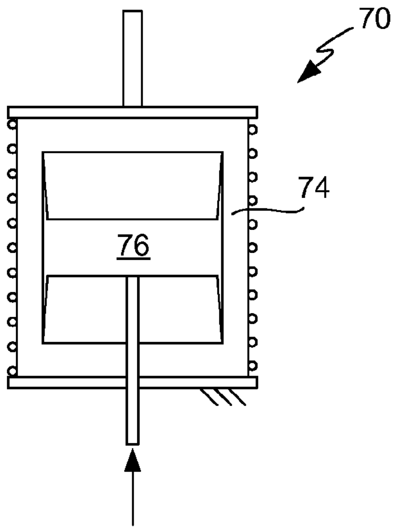
FIG. 3B illustrates the cylindrical combustion device of FIG. 3A during intake of fuel and an oxygen source.
Figure 3C:
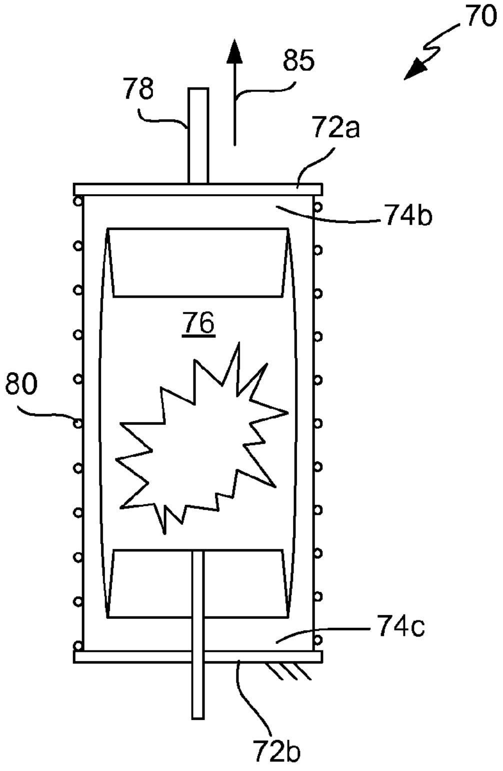
FIG. 3C illustrates the cylindrical combustion device of FIG. 3A during combustion.
Figure 3D:
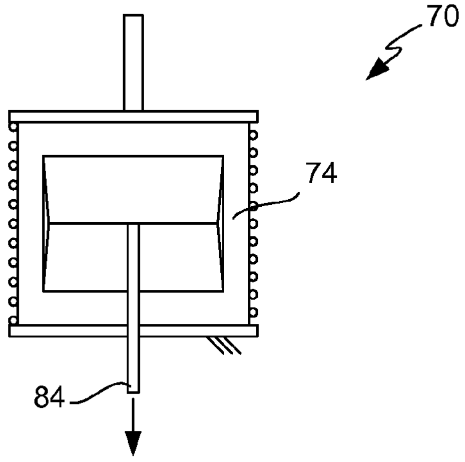
FIG. 3D illustrates the cylindrical combustion device of FIG. 3A after exhaust is complete.

FIG. 3A illustrates a simplified cross-section of a cylindrical combustion device 70, before combustion, in accordance with one embodiment of the present invention. FIG. 3B illustrates device 70 during intake of fuel and air. FIG. 3C illustrates combustion device 70 during combustion. FIG. 3D illustrates combustion device 70 after exhaust. FIGS. 3A-3D also illustrate a combustion cycle where elastic energy of a compliant wall is used to expel exhaust gases. Combustion device 70 includes rigid end plates 72, compliant wall 74, combustion chamber 76, spacers 82, output shaft 78, and port 84.

Compliant wall 74 includes a single piece of compliant material whose internal dimensions define combustion chamber 76. For convenience, compliant wall is described with multiple segments: a substantially cylindrical segment 74*a* that radially borders combustion chamber 76 along an entire axial direction of chamber 76, and end walls 74*b* and 74*c* that form substantially flat end portions to the cylindrical combustion chamber 76. In a specific embodiment, compliant wall 74 includes a soft elastomer singly molded into a desired shape and dimensions for device 70.

Constraint 80 includes a spring-like structure that reduces radial expansion of cylindrical portion 74*a* during combustion of the fuel in combustion chamber 76 and forces uniaxial expansion for the cylindrical portion 74*a* of compliant wall 74 in direction 85.

Combustion device 70 includes two spacers 82 internal to combustion chamber 76. Specifically, lower spacer 82*a* attaches to a flat inner surface of compliant wall 72*a* while upper spacer 82*b* attaches to a flat inner surface of compliant wall 72*b*. Spacers 82 reduce dead space in combustion chamber 76 before combustion of a fuel in chamber 76. Spacers 82 also increase the axial length of compliant wall 74 in direction 85. In some cases, this may reduce strain on compliant wall 74. Before fuel and air intake, as shown in FIG. 2C, spacers 82 consume a large proportion of the volume within combustion chamber 76. In this case, no space is provided between spacers 82. In another embodiment, cylindrical compliant wall 74*a* extends axially beyond spacers 82 and combustion chamber 76 includes space in an axial direction beyond spacers 82. As one of skill in the art will appreciate, reducing dead space in a combustion chamber before combustion increases efficiency. Although combustion device 70 is illustrated with two spacers 82, combustion device of the present invention may include one or any other suitable number of spacers that reduce dead space in combustion chamber 76. The spacers may also include any geometry that facilitates combustion in the combustion chamber. As shown, lower spacer 82 includes a channel that passes therethrough to allow communication of combustion gases and products. In one embodiment, spacers 82 are compliant.

Rigid end plates 72*a* and 72*b* couple to an outside surface of each compliant end wall 74*b* and 74*c*, respectively. In a specific embodiment, an adhesive adheres each end plate 72 to an outside surface of each wall 74*b* and 74*c*. Rigid plate 72*b* is fixed and does not substantially move for device 70. An output shaft 78 is coupled to endplate 72*a*. The output shaft may be coupled using any suitable mechanism, as for example a threaded engagement with a threaded hole in endplate 72*a*. The output shaft 78 provides mechanical output for combustion device 70. In this case, device 70 includes a first coupling portion 77*a* disposed on a first end wall 74*b* where it interfaces with end plate 72*a*. The first coupling portion 77*a* is disposed proximate to a first end of the substantially cylindrical compliant wall 74*a*. Device 70 includes a second coupling portion 77*b* disposed on the second end wall 74*c*, which is disposed proximate to a second end of the substantially cylindrical compliant wall 74*a*.

An intake and exhaust tube 84 passes through an aperture in rigid endplate 72*b* and an aperture in compliant wall 74*c*. Although device 70 is illustrated with a single port 84, it is understood that device 70 may employ separate tubes for intake and exhaust. In the embodiment shown, port 84 passes through a portion of device 70 that is fixed or relatively stationary during combustion. While not shown to prevent obscuring the present invention, device 70 may also include one or more valves to facilitate inlet of combustion reactants and exhaust of combustion products.

Although device 70 shows rigid plate 72*b* fixed, other designs are contemplated. For example, a central portion of compliant wall 74 may be fixed, while both ends of the cylinder are arranged to move upon combustion. In other words, a central portion of the substantially cylindrical compliant wall 74 is fixed while the ends are free to move and do mechanical work. This creates compliant segments on each side of the point of fixation and zero displacement. External attachment to each end plate 72 thus permits two mechanical outputs for a single combustion chamber. For example, a first mechanical output may be attached to rigid plate 72*b* while a second mechanical output is attached to rigid plate 72*a*. Axially offsetting where combustion device 74 is fixed away from a mechanical center for device 70 provides a different force and output for the mechanical outputs on opposing end of the cylinder, e.g., rigid plate 72*b* receives greater mechanical output than rigid plate 72*a*.

FIG. 3B illustrates cylindrical combustion device 70 during intake of fuel and air. Numerous techniques and mechanisms may be used to inlet combustion reactants into chamber 76. One technique employs external pressure to supply fuel and air into combustion chamber 76. This may create a positive pressure in chamber 76 that stretches compliant segment 74*a* and creates a volume within combustion chamber 76. In this case, the compliance of segment 74*a* and inlet pressure may be designed to achieve a desired compression ratio for the air and fuel mixture. In another technique, device 70 is actuated or externally moved to the position shown in FIG. 3B. For example, an electroactive polymer may be used to stretch compliant wall 74*a* and increase volume in combustion chamber 76. Alternatively, output shaft 78 may couple to a crankshaft whose rotational motion stretches compliant wall 74*a* and increases volume combustion chamber 76 (see FIG. 16). Other mechanism for moving device 70 to the state shown in FIG. 3B may be used.

FIG. 3C illustrates combustion device 70 during combustion 84. Since rigid endplate 72*b* and compliant portion 74*c* are fixed, and constraint 80 restricts radial expansion of compliant segment 74*a*, compliant segment 74*a* stretches axially in direction 85 as shown. Compliant segment 74*a* also thins in a radial direction substantially orthogonal to the direction of axial stretch. Typically, compliant segment 74*a* thinning occurs for the entire circular perimeter. Output shaft 78 (along with rigid plate 72*a* and compliant wall 74*b*) translates linearly in direction 85 away from rigid endplate 72*b* and compliant portion 74*c* as a result of combustion in chamber 76.

FIG. 3C also illustrates combustion device 70 at peak expansion. After combustion is complete and/or maximum deformation has been achieved, an outlet valve may be opened to permit the release of exhaust gases from combustion chamber 76. In one embodiment, elastic return of compliant wall 74*a* assists and expedites exhaust of gases from combustion chamber 76. More specifically, contraction forces stored as elastic energy in a material of compliant wall 74 act to return compliant wall 74 to a resting state, which in this case reduces the volume of combustion chamber 76 and pushes any gases included therein out an open exhaust port 84. In addition, a helical spring used as constraint 80 may also store elastic energy at peak expansion that becomes a contractile force in the axial direction to exhaust gases from a contracting combustion chamber 76.

FIG. 3D illustrates combustion device 70 after exhaust is complete. In this case, spacers 82 also facilitate the removal of exhaust gases from the combustion chamber by reducing dead space in chamber 76 and forcing combustion gases out from the chamber. Combustion device 70 is then suitable to begin a new combustion cycle. For example, a two stroke cycle may include a first stroke that includes intake (FIG. 3B), and power (FIG. 3C) stroke segments and a second stroke that accomplishes exhaust (FIG. 3D).

Figure 16:
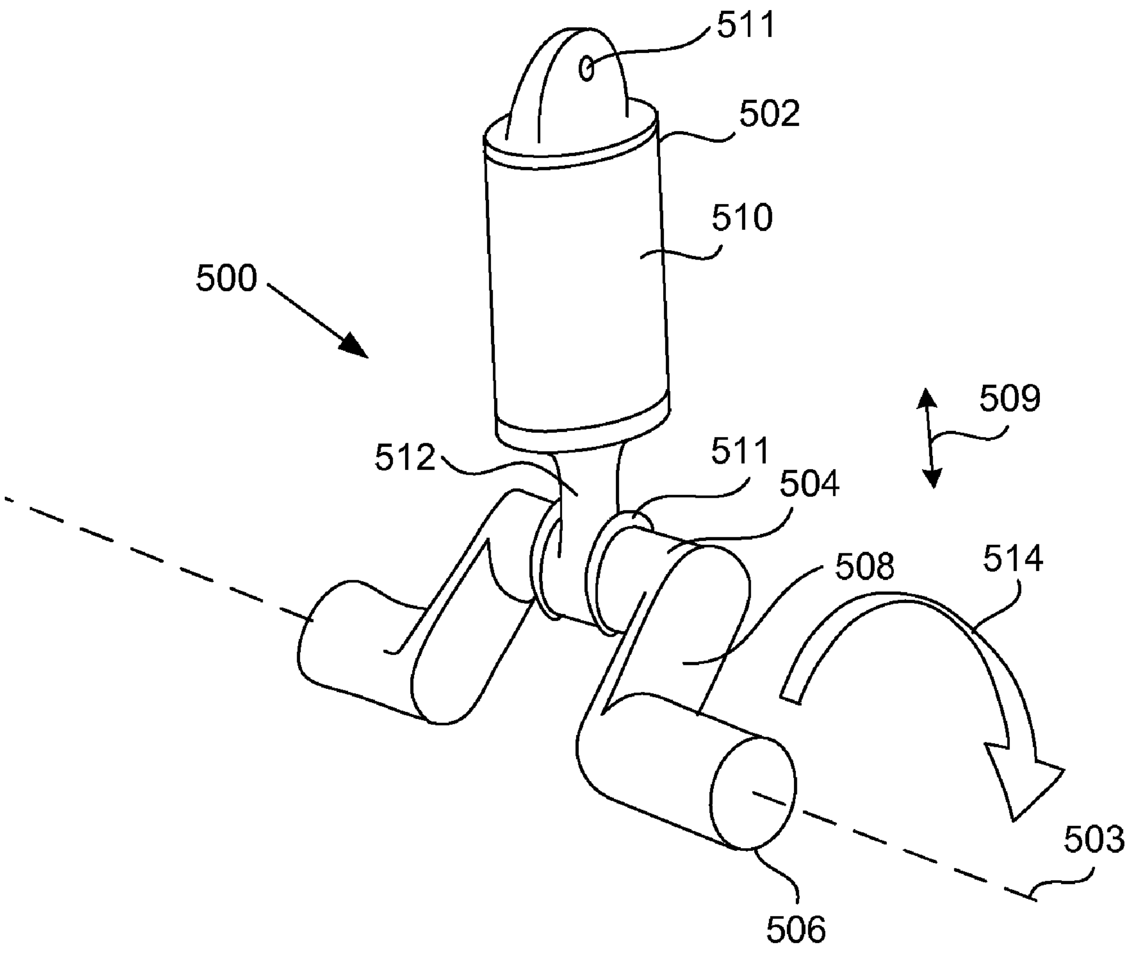
FIG. 16 illustrates a perspective view of a simplified motor in accordance with one embodiment of the present invention.

In a specific embodiment, output shaft 78 connects to a crankshaft by a connecting rod (see FIG. 16). As the crankshaft revolves, it sets timing for a combustion cycle in combustion chamber 76. For example, combustion device 70 may work as follows. For an intake stroke, output shaft 76 starts at the bottom (FIG. 3A), an intake valve opens, and the crankshaft pulls the output shaft 76 up while air and a fuel are injected into combustion chamber 76. When output shaft 76 reaches some desired position of its stroke, a spark plug (not shown) emits a spark to ignite the fuel. The fuel in combustion chamber 76 combusts, driving output shaft 76 upwards, which drives the crankshaft. Once output shaft 76 hits the top of its stroke, an exhaust valve opens and exhaust gases from the combustion leave combustion chamber 76.

Figure 4A:
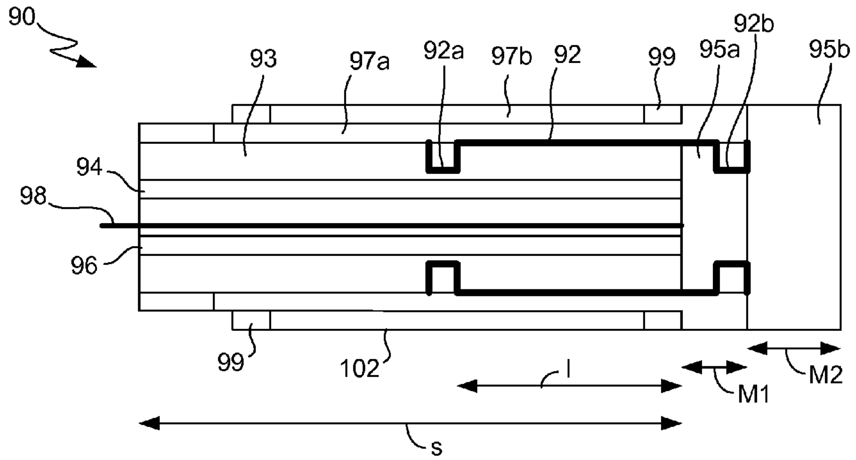
FIG. 4A illustrates a cross-section of a cylindrical combustion device, before combustion, in accordance with another embodiment of the present invention.
Figure 4B:
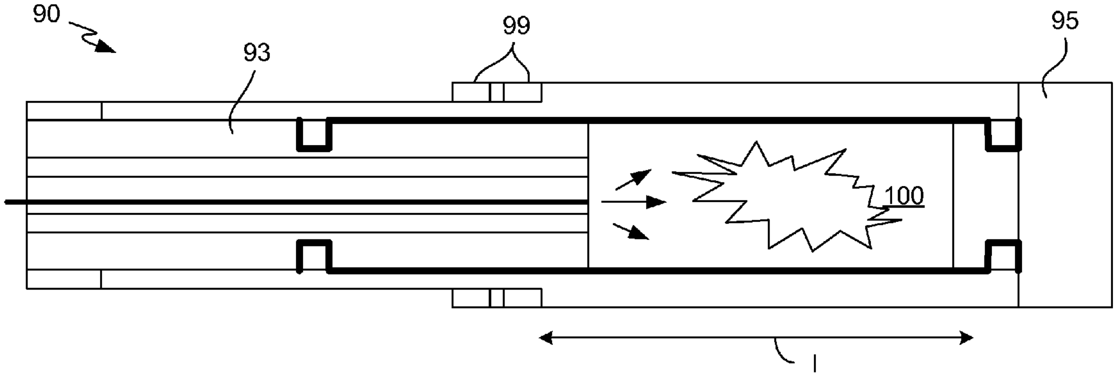
FIG. 4B illustrates the cylindrical combustion device of FIG. 4A during combustion.

FIG. 4A illustrates a cross-section of a cylindrical combustion device 90, before combustion, in accordance with another embodiment of the present invention. FIG. 4B illustrates combustion device 90 during combustion. Combustion device 90 includes compliant wall 92, inlet port 94, output port 96, ignition mechanism 98, combustion chamber 100 and linear translation mechanism 102.

Compliant wall 92 attaches to a stationary portion 93 of device 90 and to a moving head 95. For example, stationary portion 93 may include a metal or other suitably rigid material that fixes one end 92*a* of compliant wall 92. The other end 92*b* of compliant wall 92 is attached to moving head 95. Moving head 95 includes a compliant wall coupling portion 95*a* and an external coupling portion 95*b*.

An active segment 92*c* of compliant wall 92 refers to a portion of compliant wall 92 permitted to expand and stretch during combustion. In one embodiment, the active segment 92*c* includes any portions of compliant wall 92 not fixed or attached to a rigid structure or otherwise constrained in deformation during combustion within chamber 100. In this case, distal ends of compliant wall 92 are routed and attached within stationary portion 93 and moving head 95. Unattached material between these two distal ends forms the active segment 92*c* for compliant wall 92. A length, 1, axially characterizes the active segment 92$c$. Compliant segment 92$c$ is substantially cylindrical along length, 1.

Linear translation mechanism 102 constrains deformation of device 90. Linear translation mechanism 102 includes concentric cylindrical shells 97$a$ and 97$b$ and bearings 99. Cylindrical shells 97$a$ and 97$b$ share a cylindrical axis and move relative to each other via bearings 99. In a specific embodiment, cylindrical shells 97 each include a rigid material such as metal tubing, plastic or teflon. Cylindrical shell 97$a$ indirectly couples to compliant wall 92 by attaching to stationary portion 93, which attaches to one end of compliant wall 92. Cylindrical shell 97$b$ indirectly couples to the other end of compliant wall 92 by attaching to moving head 95, which attaches to the other end of compliant wall 92.

Linear translation mechanism performs several functions for device 90. Firstly, linear slide 102 constrains deformation of moving head 95 to one direction: linearly to and from stationary portion 93 parallel to an axial center of the concentric cylindrical shells. Secondly, inner cylindrical shell 97$b$ may be sized to fit outside of compliant wall 92 and prevent radial expansion of compliant wall 92 upon combustion within combustion chamber 100. Grease or another suitable lubricant may be used between the outside of compliant wall 92 and the inner surface of cylindrical shell 97$b$ to decrease friction between the two surfaces. In a specific embodiment, compliant wall 92 includes a low friction surface on its outside surface. Thirdly, slide 102 acts as a constraint that reduces bending of compliant wall 92 away from the axial direction of expansion.

In another embodiment, a combustion device includes electrostatic clamps that apply holding forces at select moments of combustion. For example, device 90 may include electrostatic clamping between two metal shells 97 at various times during a combustion cycle. The electric clamp may be arranged to hold moving head 95 at one or more particular positions in the stroke, such as at peak stroke. Holding a position may be useful in some instances. For example, a device may hold a position immediately after ignition to allow more complete fuel combustion before expansion begins for higher efficiency; or may hold a position at peak expansion to allow the gases time to cool. This second hold at peak stroke may create a partial vacuum in the chamber and allow the device to harvest return stroke energy that would otherwise be sent out as waste heat, thereby potentially increasing efficiency. Further, the two metal shells may be used for sensing and to monitor position of moving head 95. Further description of electrostatic clamping materials suitable for use with the present invention are described in commonly owned and co-pending patent application Ser. No. 11/078,678, and titled "Mechanical Meta-Materials". This application is incorporated by reference herein in it entirety for all purposes. In a specific embodiment, an electrostatic clamping material is disposed about a compliant wall and externally activated to lock the combustion device at a desired position, or otherwise alter force vs. displacement for the combustion device.

In operation, fuel and air enters combustion chamber 100 via inlet port 94. Ignition mechanism 98 includes an electrode, which when electrically activated, creates a spark that ignites a fuel and initiates combustion within chamber 100. As shown in FIG. 4$b$, combustion within chamber 100 drives moving head 95 linearly away from stationary portion 93.

In a specific embodiment, device 90 is dimensioned as follows. Compliant wall 92 is about 1 inch in outer diameter, cylindrical shell 97$b$ is about 1 inch in inner diameter, and cylindrical shell 97$a$ is about 1 inch in inner diameter plus the thickness of cylindrical shell 97$b$. Along an axial direction of cylindrical device 90, stationary portion 93 is between about 4 and 7 inches in length, s; compliant wall 92 is about 3 inches in active length, 1, before combustion; compliant wall coupling portion 95$a$ is about ½ inch in length, M1; and external coupling portion 95$b$ is about ½ inch in length, M2. This creates a combustion device 90 with a total length between about 5 and 8 inches before combustion. After combustion, compliant wall 92 may be about 3½ to about 7 inches in active length, 1. For example, moving head 95 may be controlled in dimensions (e.g., by attaching moving head 95 to a bearing on the crankshaft) such that active length, 1, extends to a desired length, e.g., about 5 inches.

Figure 5A:
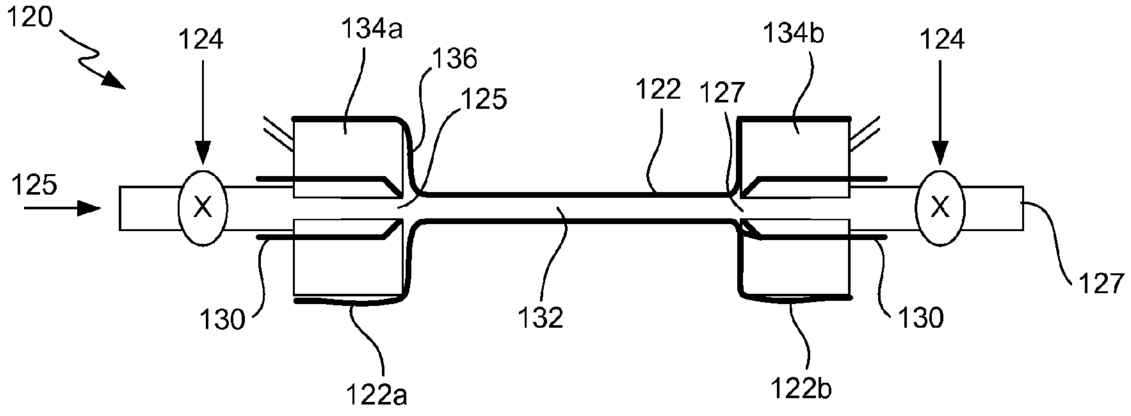
FIG. 5A illustrates a simplified cross-section of a radial combustion device, before combustion, in accordance with one embodiment of the present invention.
Figure 5B:
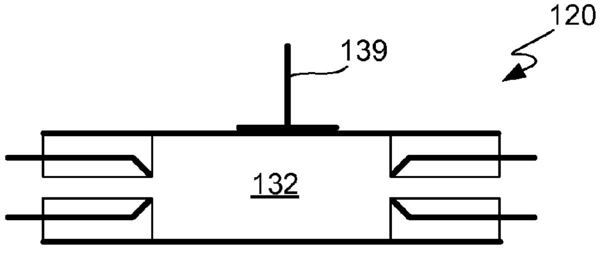
FIG. 5B illustrates the radial combustion device of FIG. 5A after fuel intake.
Figure 5C:
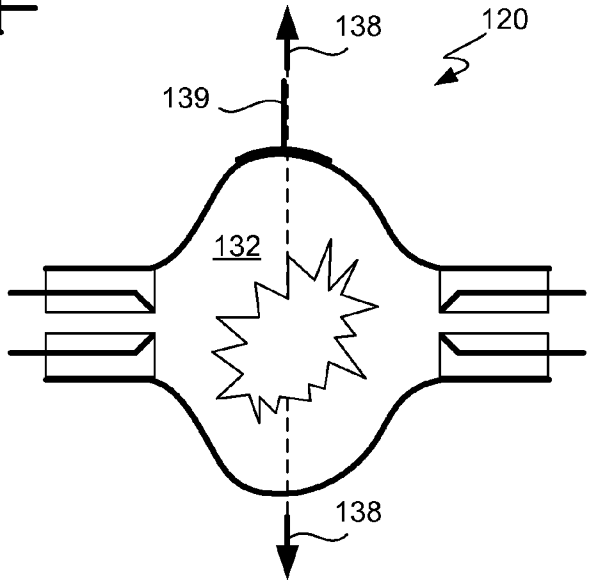
FIG. 5C illustrates the radial combustion device of FIG. 5A after combustion.

FIGS. 5A-5C illustrate a radial—or tubular—combustion device 120 in accordance with a fourth embodiment of the invention. FIG. 5A is a simplified cross-section view of the tubular combustion device 120, at the beginning of a new cycle before intake or combustion. FIG. 5B illustrates radial combustion device 120 after fuel intake. FIG. 5C illustrates tubular combustion device 120 during combustion at peak expansion. In the illustrated embodiment, combustion device 120 includes tubular compliant wall 122, inlet valve 124 exhaust valve 128, ignition mechanisms 130, combustion chamber 132 and frame 134.

Compliant wall 122 attaches at its opposing ends 122$a$ and 122$b$ to frame portions 134$a$ and 134$b$, respectively. Frame 134 includes rigid portions 134$a$ and 134$b$. Frame 134 attaches to opposite end portions of compliant wall 122 and prevents axial expansion of compliant wall 122. Specifically, frame portion 134$a$ fixes to—and prevents motion of—an end portion 122$a$ of compliant wall 122, while frame portion 134$b$ fixes to—and prevents motion of—an opposite end portion 122$b$. Since both opposite tubular ends of compliant wall 122 are fixed to prevent axial deformation, tubular compliant wall 122 radially stretches during combustion of a fuel in combustion chamber 132.

Combustion chamber 132 is formed by inner surfaces of compliant wall 122 and surfaces of walls on frame 134 that neighbor chamber 132. In this case, the shape of combustion chamber 132 changes with deformation and stretching of compliant wall 122. As shown in FIG. 5A, compliant wall 122 includes extra material, which forms bends 136 according to the pressure in combustion chamber 132, e.g., when the pressure is low.

Inlet valve 124 regulates fuel and air provision through an inlet 125, which proceeds through frame portion 134$a$ and opens into combustion chamber 132. Similarly, outlet valve 126 regulates exhaust passage via an exhaust outlet 127 that opens into combustion chamber 132. Combustion device 120 includes multiple ignition mechanisms 130, each of which includes spark electrodes for ignition of fuel within combustion chamber 132. The multiple ignition mechanisms 130 create more consistent radial expansion along the tubular axis.

FIG. 5B illustrates radial combustion device 120 after fuel intake. At this point, compliant wall 122 is substantially cylindrical or tubular between ends 122$a$ and 122$b$. Upon combustion, compliant wall 122 expands radially and directions 138 as shown in FIG. 5C. Mechanical coupling 139 is attaches to an external surface of a central portion of compliant wall 122 and provides mechanical output for combustion device 120.

Combustion device 120 provides mechanical output in 360° of radial expansion for compliant wall 122 about the tubular axis. A combustion device need not include such a large expansion area for a compliant segment or wall. Indeed, some combustion devices limit expansion of a compliant wall to smaller segments. This increases combustive forces on the smaller area.

Figure 6A:
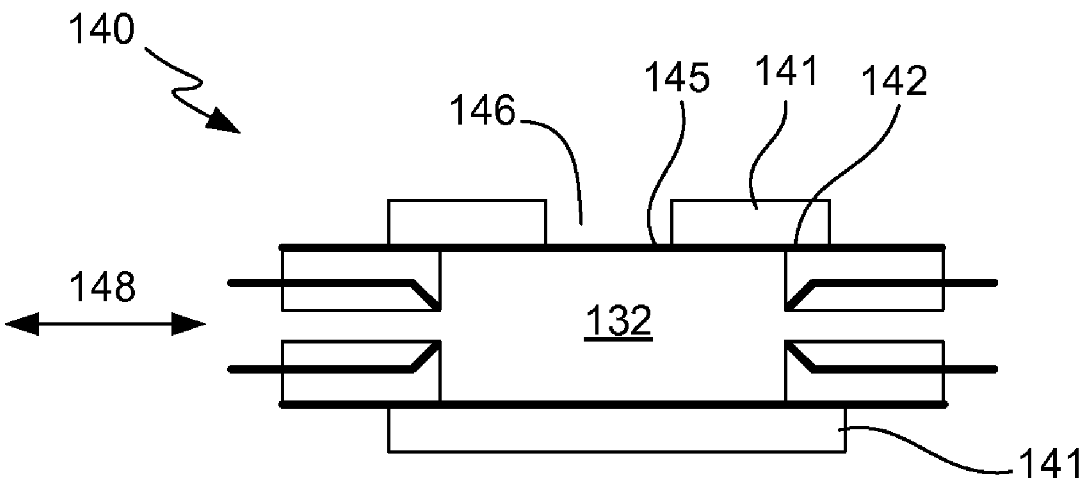
FIG. 6A illustrates a simplified cross-section of a sheathed combustion device in accordance with one embodiment of the present invention.
Figure 6B:
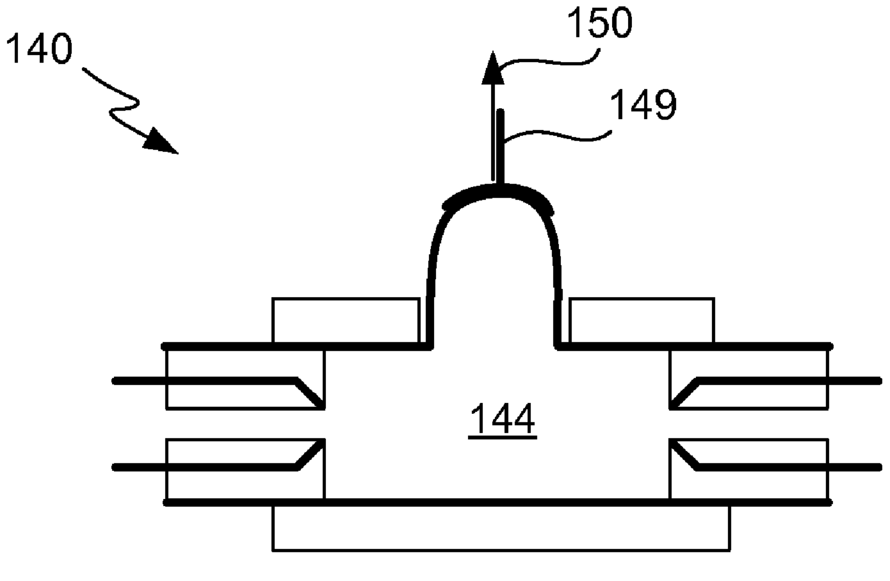
FIG. 6B illustrates the sheathed combustion device of FIG. 6A after combustion.

FIG. 6A illustrates a simplified cross-section of a sheathed combustion device 140, before combustion, in accordance with another embodiment of the present invention. FIG. 6B illustrates sheathed combustion device 140 after combustion.

Combustion device 140 includes a rigid sheath 141 that is configured to restrict expansion of compliant wall 142 during combustion of a fuel in combustion chamber 144 to within an aperture 146 in rigid sheath 141. Specifically, rigid sheath 141 surrounds compliant wall 142 with the exception of an opening provided by aperture 146. Thus, a compliant segment 145 that is free to expand is formed by the lack of rigid sheath 141 in aperture 146. Although not shown, corners of rigid sheath 141 may be rounded to prevent pinching portions of compliant wall 142 that bend around sheath 141.

In one embodiment, compliant segment 145 is cylindrical as described above with respect to combustion device 120 and the cylindrical axis passes in direction 148 (FIG. 6A). In another embodiment, combustion device 140 is cylindrical and the cylindrical axis passes in direction 150 (FIG. 6B). In this case, deformation and stretching of compliant segment 145 through aperture 146 resembles a diaphragm based on the geometry and size of aperture 146. Mechanical coupling 149 attaches to an external surface of compliant segment 145 in a region that passes through aperture 146. Coupling 149 provides substantially linear mechanical output for combustion device 120. To facilitate linear mechanical output, coupling mechanism 149 may also include one or more sets of bearings that constrain motion of an output shaft included in coupling mechanism 149 to a single degree of linear deformation.

So far, combustion devices have linearly linked mechanical output to compliant segment or wall displacement. The present invention also contemplates indirect relationships where a coupling mechanism transfers changes in the combustion device to provide mechanical output.

Figure 7A:
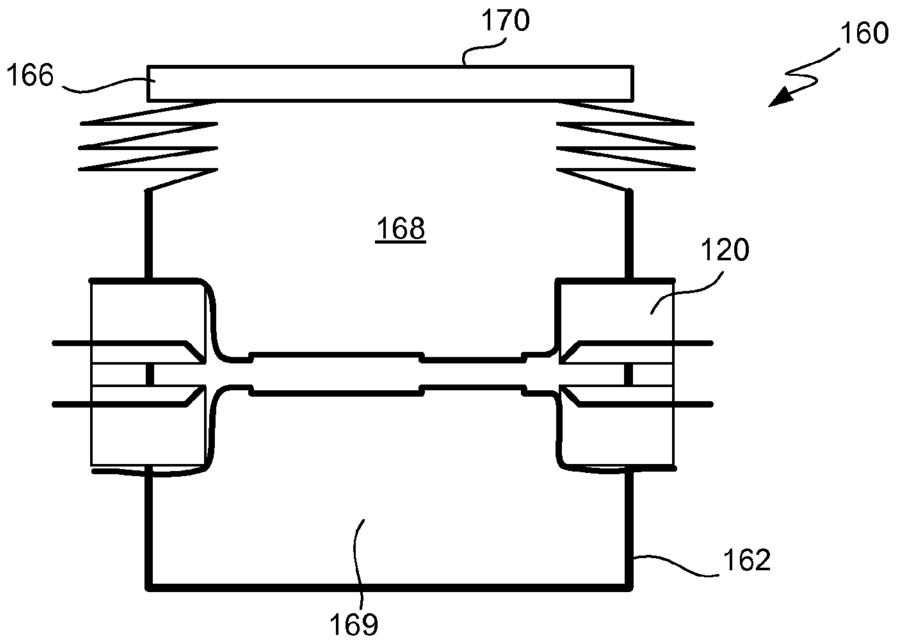
FIG. 7A illustrates a simplified cross-section of a bellows combustion device in accordance with another embodiment of the present invention.
Figure 7B:
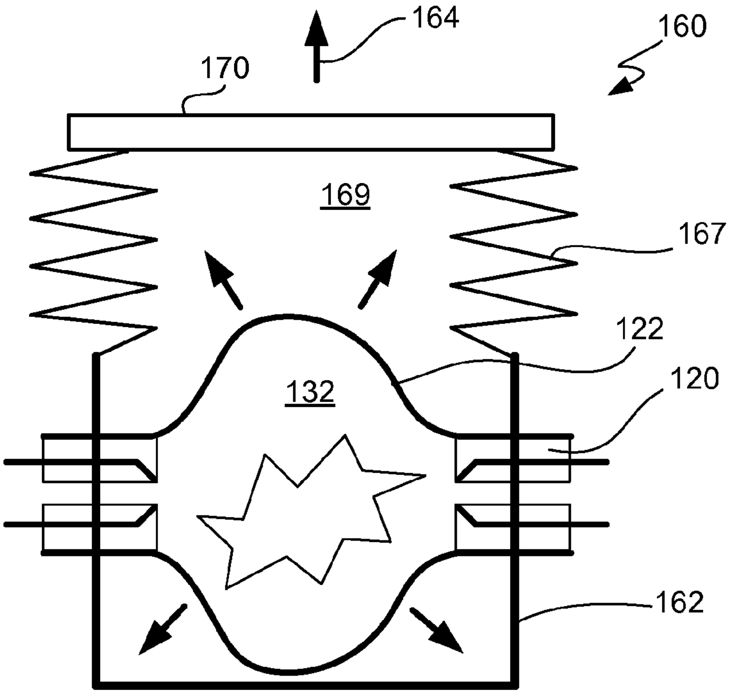
FIG. 7B illustrates bellows combustion device of FIG. 7A after combustion.

FIG. 7A illustrates a simplified cross-section of a bellows combustion device 160 in accordance with another embodiment of the present invention. FIG. 7B illustrates bellows combustion device 160 after combustion. Combustion device 160 includes combustion device 120 of FIG. 5A and a coupling mechanism 162.

Coupling mechanism 162 receives the mechanical energy produced within combustion chamber 132 and converts the mechanical energy into a linear direction of deformation 164. More specifically, coupling mechanism 162 is configured to receive a volumetric increase in combustion chamber 132 when compliant wall 122 stretches during combustion. Coupling mechanism 162 converts the volumetric increase into linear extension of a movable element 170 in direction 164. Coupling mechanism 162 includes a bellows device 166 having a limited volume 168. In one embodiment, bellows device 166 includes and seals in an incompressible liquid 169 or gel that transfers volume displacement of combustion device 120 to linear translation of a moveable element 170 along direction 164. Thus, an increase in volume for combustion chamber 132 causes expansion of side bellows 167 in direction 164 when compliant wall 122 stretches during combustion. Bellows device 166 is suitably sized to receive an increase in volume for combustion chamber 132 that causes extension of bellows 167 and element 170. This implies that bellows 167 and the volume 168 within bellows device 166 can service volumetric changes for combustion within device 120. More specifically, bellows 167 includes a position that accommodates a maximum volume for combustion chamber 132 and a position that accommodates a minimum volume for chamber 132.

Figure 8A:
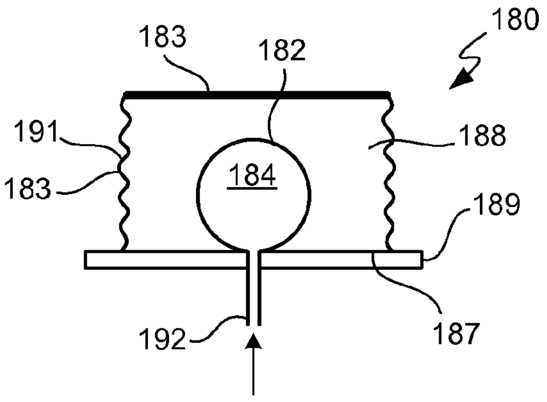
FIG. 8A illustrates a simplified cross-section of a bellows combustion device in accordance with another embodiment of the present invention.
Figure 8B:
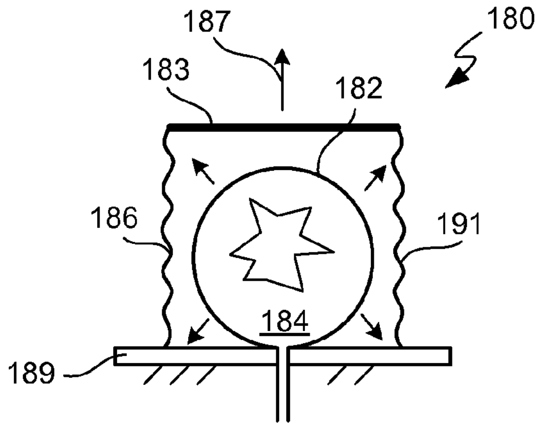
FIG. 8B illustrates the bellows combustion device of FIG. 8A after combustion.

FIG. 8A illustrates a simplified cross-section of a bellows combustion device 180 in accordance with another embodiment of the present invention. FIG. 8B illustrates bellows combustion device 180 after combustion. Bellows combustion device 180 includes compliant wall 182, combustion chamber 184, coupling mechanism 186 and fluid 188.

In one embodiment, compliant wall 182 is substantially spherical and defines a substantially spherical combustion chamber 184. Spherical combustion chambers allow the minimal surface-to-volume ratios of any geometry, and thus minimize parasitic heat losses for a given combustion volume through the walls of the combustion chamber. In this case, compliant wall 182 resembles a balloon that expands and contracts in response to the pressure status within combustion chamber 184. For spherical compliant wall 182, the set of walls that border combustion chamber 184 only includes a spherical single wall. In another embodiment, the profile shown in FIGS. 8A and 8B extends linearly in a direction normal to the cross-section shown. In this case, compliant wall 182 and combustion chamber 184 are both substantially cylindrical and extend for a length normal to the cross-section shown as determined by design.

Coupling mechanism 186 is configured to receive a volumetric increase in combustion chamber 184 and converts a combustion generated volumetric increase into linear output in direction 187. A bottom surface 185 of mechanism 186 permits mechanical attachment and coupling to mechanism 186. As shown, bottom surface 185 attaches to a rigid and non-moving wall 189. An outlet port 192 passes through non-moving wall 189 and bottom surface 185. Although not shown, device 180 may also include a separate inlet port. A top surface 183 of mechanism 186 is free to linearly move relative to bottom surface 185. Top surface 183 is rigid and permits external attachment to mechanism 186.

Coupling mechanism 186 includes one or more flexible bellows walls 191 that extend on opposite sides of mechanism 186 from top surface 183 to bottom surface 185. Bellows walls 191 expand in direction 187 in response to volumetric increases in combustion chamber 184. In a specific embodiment, bellows mechanism 186 includes a commercially available bellows device, such as one of the Silicone BL-SIT series as provided by Anver Corporation of Hudson, Mass. Bellows mechanism 186 may also be custom made for a combustion device. Other bellows devices may be used to transfer mechanical energy. In a specific embodiment, bellows 183 includes a sealed elastomer having a spring or wound high tensile fiber about its periphery that constricts deformation of the elastomer to linear displacement in direction 187. Exemplary spring and high tensile fiber geometries were described above.

A liquid or gel 188 is disposed within bellows mechanism 186 and transfers volume displacement of combustion chamber 184 into expansion of bellows mechanism 186 which causes the top surface the top surface 183 to move linear in direction 187. In other words, liquid 188 acts as a hydraulic drive responsive to pressure changes within combustion chamber 184. During combustion, when pressure within chamber 184 rises rapidly, liquid 188 pushes a) directly upwards on top surface 183 and b) on bellows walls 191 that indirectly convert the pressure into upwards movement of top surface 183. In other words, bellows mechanism 186 is constrained to linearly expand only in direction 187 and does so in response to spherical expansion of combustion chamber 184.

Exhaust of combustion gases from chamber 184 may be achieved in a number of manners. In a specific embodiment, exhaust is driven mechanically by an output shaft and crankshaft coupled to top surface 183, for example (see FIG. 16). In this case, fluid 188 and transfers compressive forces from top surface 183 onto compliant wall 182 to force gases out through port 192.

Fluid 188 also facilitates cooling of combustion device 180. More specifically, heat transferred into compliant wall 182 generated by combustion within chamber 184 dissipates convectively into fluid 188. Fluid 188 may then be cycled through a cooling system to actively cool device 180.

A spherical compliant wall 182 and combustion chamber 184 reduces the surface to volume ratio for combustion chamber 184. Often, the amount of heat lost to a wall in a combustion chamber is proportional to the surface area of the wall. Spherical compliant wall 182 minimizes heat loss into wall 182 initially when combustion begins. In addition to increasing efficiency for the device (less energy is lost his heat), this also reduces the amount of cooling needed.

Figure 9A:
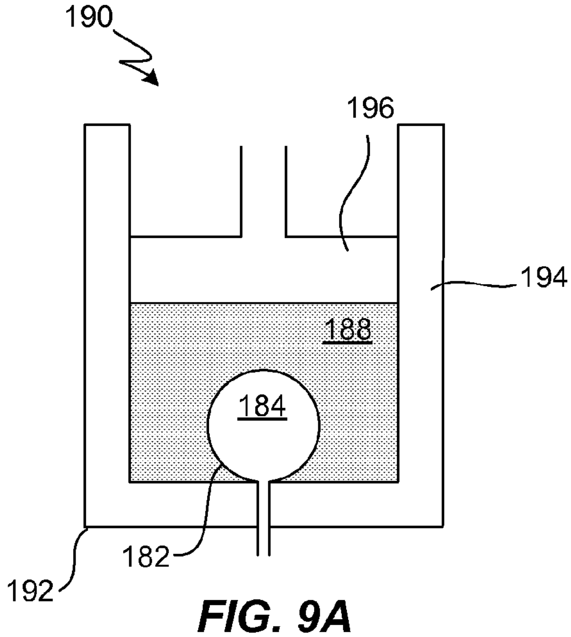
FIG. 9A illustrates a simplified cross-section of a combustion device in accordance with another embodiment of the present invention.
Figure 9B:
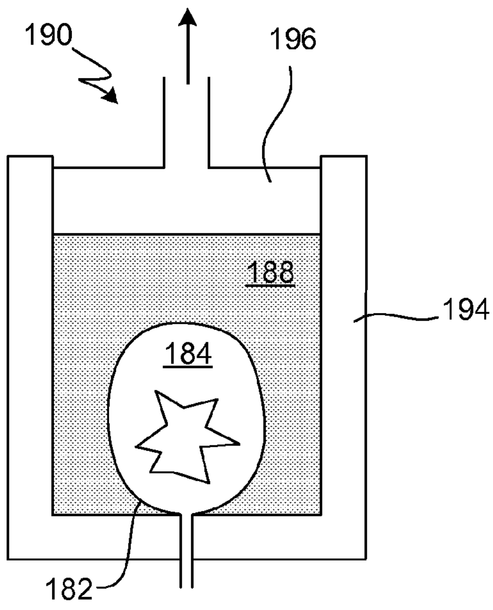
FIG. 9B illustrates the combustion device of FIG. 9A after combustion.

FIG. 9A illustrates a simplified cross-section of a combustion device 190 in accordance with another embodiment of the present invention. FIG. 9B illustrates bellows combustion device 190 after combustion. Combustion device 190 includes compliant wall 182, combustion chamber 184, a hydraulic coupling mechanism 192 and fluid 188.

Compliant wall 182, fluid 188 and combustion chamber 184 are similar to that described above with respect to FIG. 8A. Coupling mechanism 192 in this case includes a hydraulic cylinder including a rigid cylinder housing 194 and a piston 196 that linearly translates within housing 194. Housing 194 and piston 196 also cooperate to seal in fluid 188. Combustion of a fuel within chamber 184 causes compliant wall 182 to push on fluid 188, which in turn pushes up on piston 196 (housing 194 is rigid and thus receives no mechanical work from fluid 188).

Piston 196 may also be used to facilitate exhaust of combustion gases from chamber 184. An output shaft and crankshaft coupled to piston 196, for example, may be used to drive exhaust of combustion gases from chamber 184 (see FIG. 16). Similar to that described above, fluid 188 transfers forces between piston 196 and combustion chamber 184—including both forces generated within chamber 184 (e.g. combustion) and forces applied by piston 196 (e.g. crankshaft forces).

FIGS. 8 and 9 illustrate ways in which a compliant wall combustion device may couple its mechanical output to a liquid (which may itself couple to a linear output device such as a piston or bellows). The mechanical pressure exerted on the liquid by the compliant wall combustion device may itself be the desired output for a pump. In this case, the piston-cylinder or bellows is instead a rigid fixed volume chamber with liquid input and output valves, thereby allowing the compliant walled combustion device to act as a pump.

Liquid piston engines are known to those skilled in the art. However, compared to conventional liquid piston engines, compliant wall combustion devices of the present invention keep the combustion chamber separate from the liquid, thus eliminating liquid surface breakup, frothing, and other problems associated with conventional liquid piston pumps.

So far, combustion devices have been discussed where combustion energy stretches a wall. Other designs are possible with the present invention. In some cases, walls of a combustion device change shape during a combustion cycle.

Figure 10A:
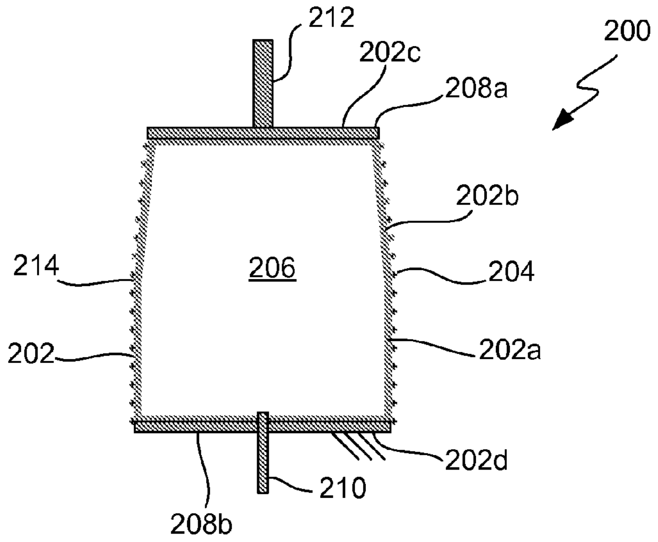
FIG. 10A illustrates a shape changing combustion device in accordance with one embodiment of the present invention.
Figure 10B:
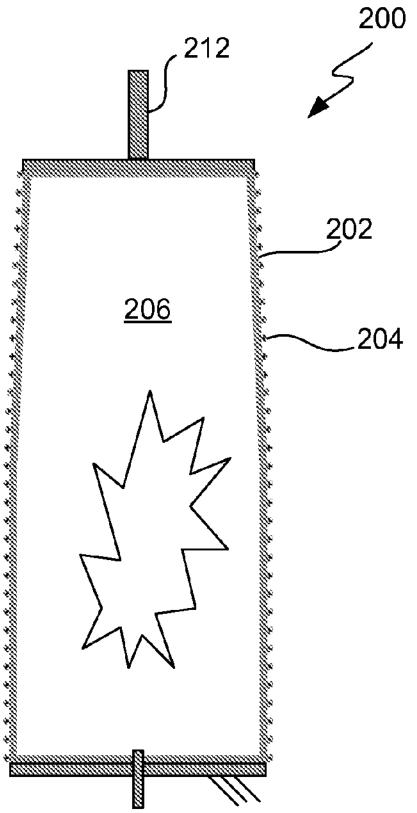
FIG. 10B illustrates the combustion device of FIG. 10A after combustion.
Figure 10C:
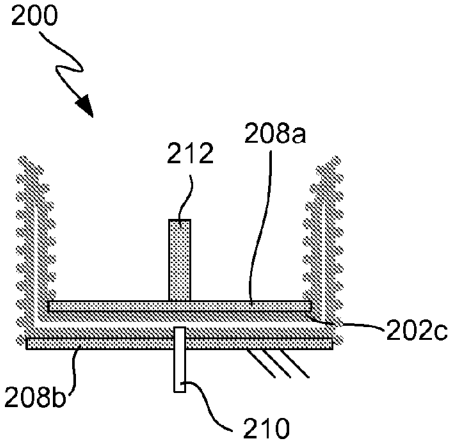
FIG. 10C illustrates the combustion device of FIG. 10A after exhaust.

FIG. 10A illustrates a shape changing and compliant walled combustion device 200 in accordance with another embodiment of the present invention. FIG. 10B illustrates the shape changing combustion device 200 after combustion. FIG. 10C illustrates the shape changing combustion device 200 after exhaust. Combustion device 200 includes wall 202, constraint 204, combustion chamber 206, rigid end plates 208, at least one port 210, and output shaft 312.

Compliant wall 202 includes a compliant material whose internal dimensions define combustion chamber 206. Compliant wall 202 will be described in terms of four wall portions: a substantially cylindrical wall segment 202*a*, frustoconical wall segment 202*b*, top flat wall segment 202*c* and bottom flat wall segment 202*d*. Cylindrical segment 202*a* radially borders combustion chamber 206 along an axial direction from bottom flat segment 202*d* to a bending point 214 in wall 202. Frustoconical segment 202*b* radially borders combustion chamber 206 along an axial direction from bending point 214 to top flat wall segment 202*c*. Frustoconical wall portion 202*b* decreases in diameter from a maximum diameter at bending point 214 according to the diameter of cylindrical wall 202*a* to a minimum diameter at top flat wall segment 202*c* which matches the diameter of the top flat wall segment 202*c*. At rest, frustoconical wall segment 202*b* resembles a reducing diameter tube whose wall thickness remains about constant. Top and bottom flat wall segments 202*c* and 202*d* form substantially flat end portions to combustion chamber 206. Top flat wall segment 202*c* is sized with a diameter such that it may fit within the inner diameter of cylindrical segment 204*a*. In a specific embodiment, compliant segment 202 includes a soft elastomer molded into a desired shape and dimensions for device 200.

Rigid end plates 208*a* and 208*b* couple to an outside surface of each compliant end segment 202*c* and 202*d*, respectively. Rigid plate 208*b* is externally fixed and does not substantially move. An output shaft 212 attaches to rigid endplate 208*a* and provides mechanical output. Device 200 also includes one more ports 210 for communicating gases into and out of combustion chamber 206. Constraint 204 prevents radial expansion of compliant wall 202 and is dimensioned to the outer diameter of compliant wall 202 for both cylindrical segment 202*a* and frustoconical segment 202*b*.

Operationally, FIG. 10A illustrates device 200 during fuel and air intake. FIG. 10B illustrates device 200 during combustion at peak expansion. FIG. 10C illustrates device 200 at the end of exhaust. Bending point 214 facilitates bending of wall 202 and allows frustoconical portion 202*b* to collapse into chamber 206 such that frustoconical portion 202*b* and top flat wall portion 202*c* fit within cylindrical portion 202*a*. This facilitates exhaust of gases out from combustion chamber 206. Folding in compliant wall 202 as shown also reduces dead space within chamber 206.

While 10C illustrates device 200 having minimal dead space within chamber 206, the amount of dead space within chamber 206 after exhaust may vary. In a specific embodiment, output shaft 212 connects to a crankshaft that drives displacement of rigid end plate 208*a* and the amount dead space within chamber 206 after exhaust. Some designs may include complete collapse as shown (see FIG. 16). Other embodiments including a frustoconical design may not collapse as completely as shown (top flat wall portion 202*c* may not reach bottom flat wall portion 202*d*). In one embodiment, combustion chamber 206 includes an exhaust volume that is less than about 50% of a peak expansion volume for combustion chamber 206. In a specific embodiment, combustion chamber 206 includes an exhaust volume that is less than about 25% of a peak expansion volume for combustion chamber 206.

In one embodiment, a crankshaft attached to output rod 212 controls displacement of top flat wall portion 202*c* and frustoconical portion 202*b* and drives collapse of top flat wall portion 202*c* into combustion chamber 206 (see FIG. 16). In another embodiment, elastic energy stored in compliant wall 202 at peak expansion returns top flat wall portion 202*c* at least partially into combustion chamber 206.

Combustion device 200 may include features described above with respect to combustion devices 50 and 70 described above. For example, rigid end plates that attach to the cylindrical and frustoconical sidewalls (and form inner walls for combustion chamber 206) may replace top and bottom flat wall portions 202*c* and 202*d*. In addition, constraint 204 may include examples described above with respect to constraints 58 and 80.

Combustion device 50 of FIG. 2A illustrates a substantially cylindrical geometry while combustion device 200 of FIG. 10A illustrates a combined cylindrical and frustum design. Alternatively, a combustion device of the present invention may include a frustum design from one end to another.

So far, the present invention has been described primarily with respect to compliant walls that stretch in response to combustion within a combustion chamber. Deflection of a compliant wall may also include other forms of the deflection, such as contraction in response to combustion within a combustion chamber, shape changes in response to combustion within a combustion chamber, etc.

Figure 11A:
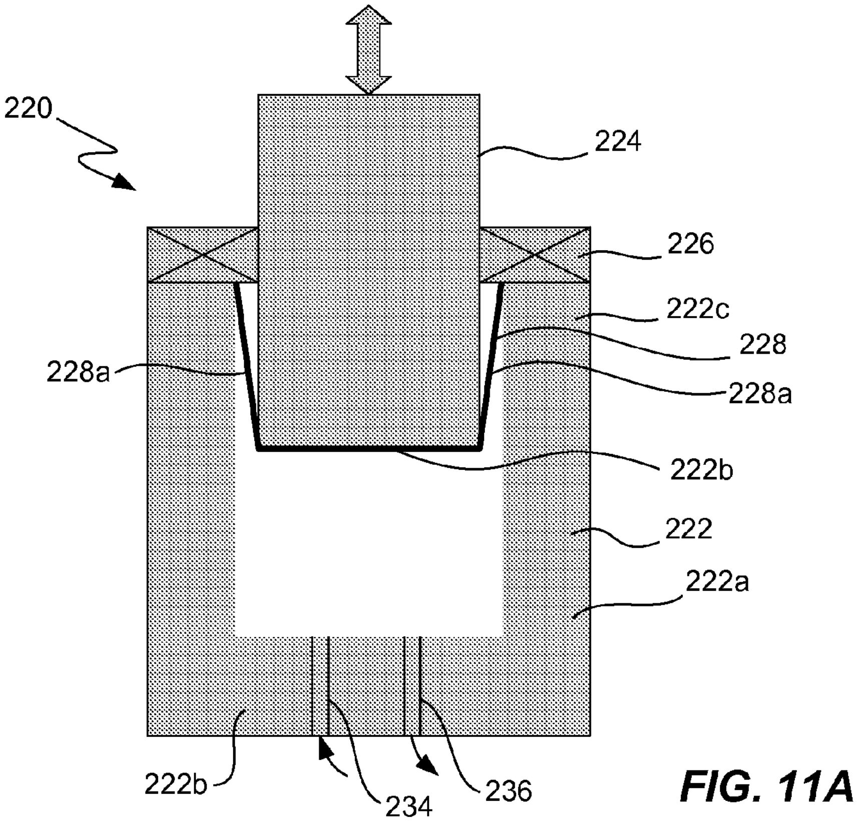
FIG. 11A illustrates a combustion device including a compliant wall that is configured to provide a compliant wall in one direction of the sealed combustion chamber in accordance with another embodiment of the present invention.
Figure 11B:
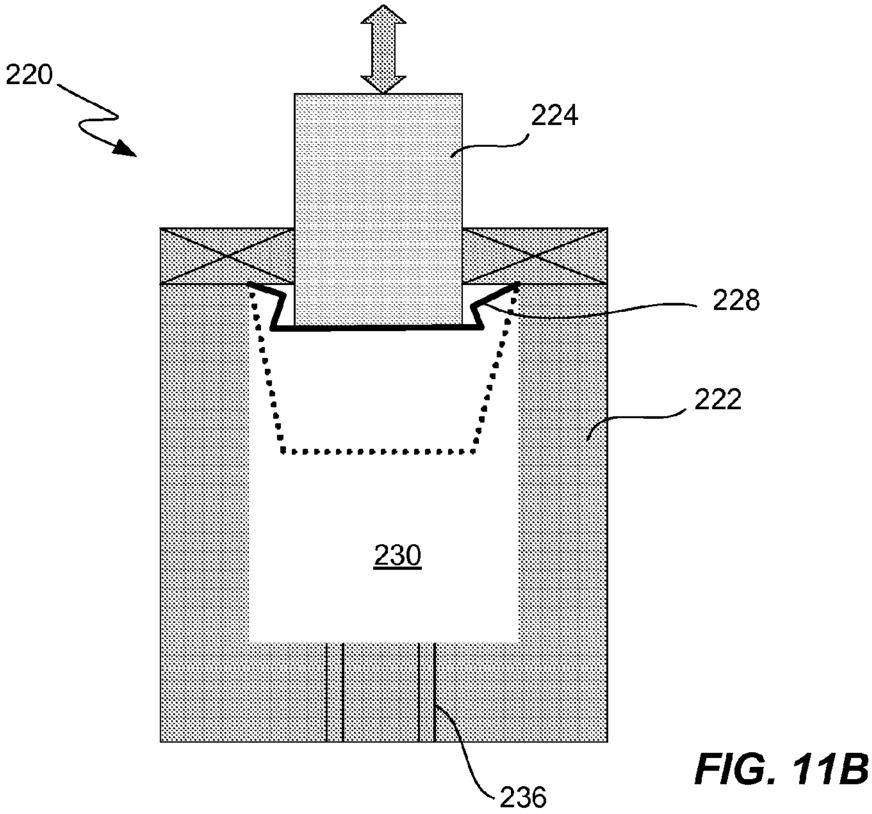
FIG. 11B illustrates the combustion device of FIG. 11A after combustion.

FIG. 11A illustrates a combustion device 220 including a compliant wall 228 including a complaint segments 228 that is configured to contract in response to combustion in accordance with another embodiment of the present invention. FIG. 11B illustrates combustion device 220 after combustion. Device 220 produces mechanical energy from a fuel and includes a housing 222, piston 224, bearings 226 and compliant wall 228.

Housing 222 includes a rigid structure and a set of rigid walls. Rigid walls for housing 222 include a cylindrical wall 222*a* and a bottom wall 222*b*. Inner walls of housing 222 cooperate with an inner surface of compliant wall 228 to define dimensions of combustion chamber 230. Housing 222 may include a suitably stiff material such as a metal or plastics. Other materials are suitable provided they have a stiffness that does not react to combustion and can withstand heat generation within combustion chamber 230. Housing 222 also includes two ports: an inlet port 234 that permits combustion reactants to enter chamber 230, and port 236 that allows combustion products to exit chamber 230.

Combustion device 220 is notably different from other combustion devices described herein in that device 220 includes a piston. However, device 220 separates itself and conventional piston cylinder engines in that compliant wall 228 separates piston 224 from the combustion chamber 230. In this case, piston 224 acts as mechanical output for device 220. Piston 224 translates into and out of combustion chamber 230 with the help of bearings 226. As the term is used herein, a piston refers to a rigid member that translates relative to a combustion chamber in response to combustion within the combustion chamber. Bearings 226 neighbor piston 224 and guide linear translation of piston 224. More specifically, bearings are disposed on an upper wall of housing 222 and permit low friction movement of piston 224 relative to bearings 226 and combustion chamber 230.

Compliant wall 228 spans the top portion of rigid wall 222*a*. Compliant wall 228 also couples to a bottom surface of piston 224. The coupling may include direct attachment between an outer surface of compliant wall 228 and the bottom surface of piston 224 or indirect attachment via another object placed between the two components. Notably, piston 224 does not include a surface or portion that forms a wall of combustion chamber 230.

Combustion devices described so far have been configured such that a compliant wall stretches in response to combustion within a combustion chamber. Combustion device 220, however, is different since compliant wall 228 may be configured to either expand or contract in response to combustion within combustion chamber 230. Compliant wall 228 includes multiple portions: a fixed portion 228*b* attached to the bottom of piston 224 and compliant segment 228*a* that deforms in response to combustion in chamber 230. In a specific embodiment, device 230 is cylindrical and piston 224 and fixed portion 228*b* are round while compliant segment 228*a* takes a frustoconical shape. In one embodiment, compliant wall 228 is contiguous beyond its dimensions within chamber 230 and includes a portion that is secured between bearings 226 and a top portion 222*c* of housing 222.

In operation, combustion within combustion chamber 230 causes an increase in volume for combustion chamber 230, which forces piston 224 to move from a position as shown in FIG. 11A to a position shown in FIG. 11B. Piston 226 may couple to a crankshaft (FIG. 16) that drives motion of piston 224 back into combustion chamber 230 to facilitate exhaust of gases from chamber 230 (FIG. 11A).

Compliant wall 228 has several functions for combustion device 230. Firstly, wall 228 seals chamber 230. Thus, compliant wall 228 prevents combustion products and gases from escaping combustion chamber 230 through the piston 224/cylinder 222 gap. In addition, compliant wall 228 prevents heat loss through the piston cylinder gap, which increases efficiency for combustion device 230. Secondly, since piston 224 does not include movable parts and a potential gap (that loses combustion gases or heat) within the combustion chamber 230, tolerances on piston 224 or bearings 226 may be relaxed. Thirdly, since there are no moving parts within combustion chamber 230, lubrication oil is not required within combustion chamber 230. In one embodiment, combustion chamber 230 does not include a lubricant other that any fuel used and chamber 230. Fourthly, compliant wall 228 may include a heat insulating material that reduces heat loss from combustion chamber 230 and increases efficiency of combustion device 220.

Figure 12A:
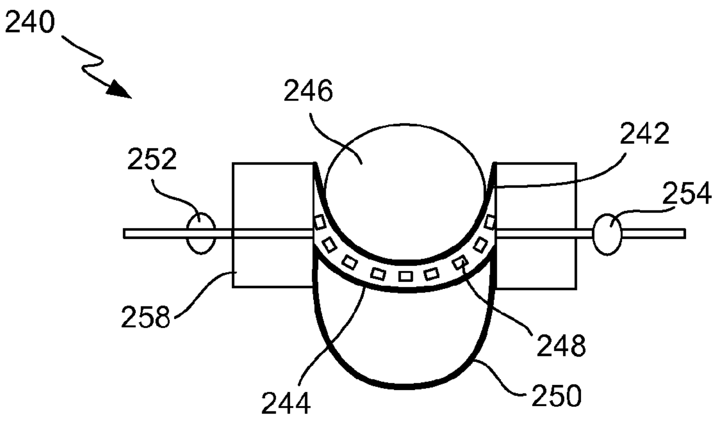
FIG. 12A illustrates a membrane fuel control combustion device in accordance with another embodiment of the present invention.
Figure 12B:
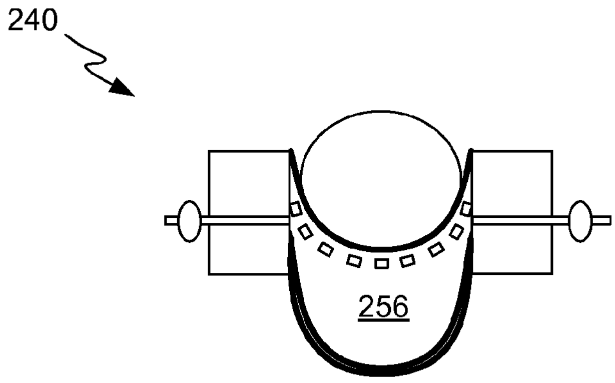
FIG. 12B illustrates the combustion device of FIG. 12A after fuel intake.
Figure 12C:
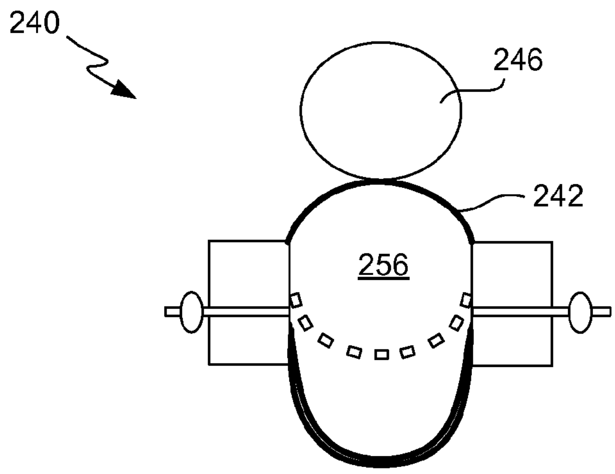
FIG. 12C illustrates the combustion device of FIG. 12A after combustion.

FIG. 12A illustrates a simplified cross-sectional view of a membrane fuel control combustion device 240 in accordance with another embodiment of the present invention. FIG. 12B illustrates the membrane fuel control combustion device 240 after fuel intake. FIG. 12C illustrates the membrane fuel control combustion device 240 after combustion. Device 240 includes a first compliant wall 242, second compliant wall 244, coupling mechanism 246, porous separator 248, rigid support 250, housing 258, and intake valve 252, and outlet valve 254.

Combustion device 240 differs from combustion devices described so far in that compliant wall 242 is configured to change shape when deforming from a negative cup angle to a positive cup angle based on combustion within combustion chamber 256. Compliant wall 242 may also stretch as a result of combustion. More specifically, compliant wall 242 starts out stretched in a direction and position that reduces the volume of combustion chamber 256, deforms (as a result of combustion) through an inflection point where surface area for wall 242 may decrease, changes shape from cupped to bowed, and then may stretch in a direction and to a position that increases the volume of combustion chamber 256.

In the cross-sectional views shown, a combustion chamber 256 is formed by a bottom side of compliant wall 242, a top side of compliant wall 244 and sidewalls included in housing 258 on either side of combustion chamber 256 as shown. The volume and shape of combustion chamber 256 will vary with the position of each compliant wall 244 and 242. In one embodiment, housing 258 is substantially cylindrical out its top opening and compliant wall 242 attaches to housing 258 about a perimeter of the circular hole and spans the circular hole, thereby forming a top compliant wall for combustion chamber 256.

A porous separator 248 is disposed in combustion chamber 256 and laterally spans the combustion chamber from one wall of housing 258 to an opposite wall of housing 258. Porous separator 248 permits gaseous and fluidic transport through its surfaces from one side to the other. For example, porous separator 248 may include a plastic disk having numerous holes or a metal screen comprising a mesh of thin wires. During exhaust of combustion products from chamber 256, the solid compliant walls 244 and 242 are restricted from contacting each other via porous separator 248, which also sets a minimum volume within chamber 256 according to its dimensions (thickness and surface area).

For fuel intake, fuel and air are pumped into combustion chamber 256 through inlet valve 252 and compliant wall 244 deflects from the position shown in FIG. 12A to the position shown in FIG. 12B. In one embodiment, the fuel and air are pressurized and wall 244 has a reduced compliance that allows it to expand and open up chamber 256. In a specific embodiment, wall 244 includes an electroactive layer so it can move down by applying voltage to open up the combustion chamber. In addition, the pressure used to supply the air and gas is insufficient to move coupling member 246. Each valve 252 and 254 includes an aperture in housing 258 that opens into combustion chamber 256. In another embodiment, the fuel control membrane is made of an actuated electroactive polymer material. When voltage is applied to the electroactive polymer, any small pressure difference between the fuel inlet side and the atmosphere will cause the fuel control membrane to bulge in that direction, thus allowing fuel intake.

For combustion, an ignition mechanism included in the device 248 ignites the fuel and chamber 256 initiates combustion. In a specific embodiment, electric leads are disposed on porous separator 248 and reaches central portion of the cross-sectional area for separator 248 and combustion chamber 256. Combustion of the fuel forces compliant wall 242 to deflect upwards as shown in FIG. 12C. Rigid support 250 limits motion and deflection of compliant wall 244. In one embodiment, rigid support 250 prevents compliant wall 244 from moving past a desired position after fuel intake. In a specific embodiment, rigid support 250 includes a porous plastic or metal cup shaped to a desired profile for the static position of compliant wall 244 during combustion. Upon combustion, compliant wall 244 thus assumes the shape, profile and stiffness of rigid support 250 and mechanical energy generated from combustion of the fuel goes into moving compliant wall 242 and mechanical coupling 246 attached thereto. Coupling mechanism 246 attaches to an outside surface of compliant wall 242. Combustion of the fuel within chamber 256 pushes coupling mechanism 246 upwards.

In another embodiment, the separator 248 is not present, and the shape of the fuel control 244 membrane is defined by the compliant wall 242 before air-fuel intake and rigid wall 250 after air-fuel intake.

An alternate embodiment involves replacing fuel control membrane 244, porous separator 248 and rigid support 250 with a non-porous rigid structure that is of the same shape as rigid support 250. In this case, fuel intake is achieved through external valves and not through a fuel control membrane 244. The rigid wall in this case provides a fixed constraint, thus allowing the compliant wall 242 to undergo shape change similar as described in FIGS. 12B and 12C.

Motor Designs

In general, a motor in accordance with the present invention includes one or more compliant walled combustion devices configured in a particular motor design. The design converts repeated deformation of a compliant walled combustion device into continuous rotation of a power shaft included in a motor. There are an abundant number of motor and engine designs suitable for use with the present invention—including conventional motor and engine designs retrofitted with one or more combustion devices described herein and custom motor designs specially designed for compliant walled combustion device usage. Several motor and engine designs suitable for use with the present invention will now be discussed. These exemplary designs convert deformation of one or more combustion devices into output rotary motion for a rotary motor or linear motion for a linear motor.

FIG. 16 illustrates a perspective view of a simplified rotary motor 500 in accordance with one embodiment of the present invention. Motor 500 converts linear mechanical output from one or more combustion devices to rotary mechanical power. As shown in FIG. 16, rotary crank motor 500 includes four elements: a compliant walled combustion device 502, a crank pin 504, a power shaft 506, and a crank arm 508.

As the term is used herein, a crank refers to the part of a rotary motor that provides power to the power shaft 506. For motor 500, the crank includes combustion device 502, crank pin 504, and crank arm 508. Combustion device is capable of reciprocal translation in a direction 509. Crank pin 504 provides coupling between combustion device 502 and crank arm 508. Crank arm 508 transmits force between the crank pin 504 and the power shaft 506. Power shaft 506 is configured to rotate about an axis 503. In this case, rotational direction 514 is defined as clockwise rotation about axis 503.

A bearing 511 facilitates coupling between combustion device 502 and crank pin 504. Bearing 511 is attached on its inner surface to the crank pin 504 and attached on its outer surface to a mechanical output shaft or connecting rod 512 that is attached to a moving end of combustion device 502. Bearing 511 allows substantially lossless relative motion between connecting rod 512 and crank pin 504.

Connecting rod 512 is connected on one end to combustion device 502 and on the opposite end to crank pin 504 to connectivity between combustion device 502 and crank pin 504. In this case, the top end of connecting rod 512 is connected to combustion device 502 and translates up-and-down in direction 509. The opposite end of connecting rod 512 couples to crank pin 504 and rotates around power shaft 506 with crank pin 504. A pin 511 allows combustion device 502 to pivot while connecting rod 512 traces an orbital path about axis 503. Upon combustion within combustion device 502, the upper end of the connecting rod moves downward with the combustion device 502 in direction 509. The opposite end of the connecting rod moves down and in a circular motion as defined by crank arm 508, which rotates about crankshaft 506.

Combustion of a fuel within combustion device 502 moves crank pin 504 down and causes power shaft 506 to rotate. As bearing 511 translates downward in direction 509, crank pin 504 rotates about power shaft 506 in clockwise direction 514. Combustion of a fuel within combustion device 502 may be referred to as the ‘power stroke’ for the motor 500. As linear deformation of combustion device 502 continues, crank pin 504 follows an orbital path around power shaft 506 as defined by the geometry of crank arm 508.

In a specific embodiment, crank pin 504 reaches its furthest downward displacement in direction 509 (bottom dead center) as combustion for combustion device 502 finishes.

Momentum of crank pin 504 and crank arm 508 continue to move crank pin 504 in direction 514 around power shaft 506 at bottom dead center. Elastic return of a compliant wall 510 may also cause output shaft 512 to deflect upwards. Elastic return of the compliant wall 510, and momentum of crank pin 504 and crank arm 508, continues to move crank pin 504 upwards in direction 514 around power shaft 506. When the crank pin 504 passes its minimal downward displacement in the direction 509 (top dead center), combustion of a fuel in combustion device 502 begins again. Combustion and elastic return in this manner may be repeatedly performed to produce continuous rotation of the power shaft 506 about axis 503.

For motor 500, movement of combustion device 502 from top dead center to bottom dead center is called a downstroke, and movement of the combustion device 502 from bottom dead center to top dead center is called an upstroke. As illustrated, combustion device 502 combusts a fuel during the downstroke and uses elastic return of the compliant wall 510 during the upstroke to make one complete revolution of the power shaft 506. Other embodiments are permissible. For example, the upstroke and downstroke can be switched be re-positioning the combustion device 502 below the power shaft 506. In this case, combustion within combustion device 502 and elastic return of compliant wall 510 contribute to separate portions of the rotation of power shaft 506.

The combustion device 502 may include any device described herein where connecting rod 512 is used as the mechanical output. One advantage of the rotary output provided by motor 500 is exhaust of gases from combustion device 502, and control of combustion chamber dimensions during an exhaust stroke, can be achieved by tailoring the length of crank arm 508. For example, the degree of collapse for combustion device 200 may be controlled using length of crank arm 508.

As shown in FIG. 16, power shaft 506, crank arm 508, and crank pin 504 are a single continuous structure, also referred to as a crankshaft. A crankshaft is a shaft with an offset portion—a crank pin and a crank arm—that describes a circular path as the crankshaft rotates. In another embodiment, the power shaft 506, the crank arm 508, and the crank pin 504 are separate structures. For example, crank arm 508 may be a rigid member rotably coupled to the crank pin 504 at one end and attached to the power shaft 506 at another end, e.g., similar to a bicycle pedal crank.

The exemplary motor shown in FIG. 16 has been simplified in order to not unnecessarily obscure the present invention. As one of skill in the art will appreciate, other structures and features may be present to facilitate or improve operation. For example, the end of combustion device 502 opposite to rod 512 may be grounded or coupled to a pin that permits pivoting. In addition, combustion device 502 may be significantly larger than as shown to reduce the amount of compliant wall 510 strain needed to rotate the crank pin 504. As shown, combustion device 502 may rely on large linear strain to fully rotate the crank, which is suitable for some combustion devices of the present invention. However, a larger combustion device 502 may be used to reduce the amount of strain needed in compliant wall 510 to rotate the crank pin 504. For example, the size of combustion device 502 may be selected to produce a strain of about 20 percent to about 100 percent linear strain in the compliant wall 510 to rotate crank pin 504.

Using a single combustion device 502 as described with respect to the motor 500 may result in uneven power distribution during rotation of power shaft 506. Full reliable rotation of the shaft may also require substantial rotational inertia and speed to prevent the shaft from merely rotating in an oscillatory fashion (i.e. less than 360 degrees rotation). In one embodiment, a rotary motor of the present invention includes multiple combustion devices that provide power to rotate a power shaft. The multiple combustion devices may also be configured to reduce dead spots in rotation of the power shaft, e.g., by offsetting the combustion devices at different angles, thus producing a more consistent and continuous flow of output power for the motor.

Although FIG. 16 shows combustion device 502 coupled to a single crank pin, motors of the present invention may include multiple crank pins, or multiple throws, each coupled to a combustion device 502. For example, a plurality of cranks may be arranged substantially equally about a crankshaft, where each crank is dedicated to a combustion device 502. The present invention may encompass any suitable number of cranks arranged in a suitable manner around the power shaft. 2, 4, 6, and 8 crank arrangements are common. In one embodiment, combustion devices are arranged around the power shaft such that they counterbalance each other.

Motors of the present invention comprising multiple combustion devices may be described according to the arrangement of the combustion devices about a power shaft. In one embodiment, combustion devices are aligned about a power shaft in an opposed arrangement with all combustion devices cast in a common plane in two side rows about the power shaft, each opposite the power shaft. In another embodiment, combustion devices are aligned about power shaft in an inline arrangement about the power shaft. In yet another embodiment, combustion devices are aligned about power shaft in a Vee about the power shaft, with two banks of combustion devices mounted in two inline portions about the power shaft with a Vee angle between them. Combustion devices in the Vee may have an angle between about 0 degrees and 180 degrees. Multi-input motor arrangements are well-known to one of skill in the art and not detailed herein for sake of brevity.

While this invention has been described in terms of several preferred embodiments, there are alterations, permutations, and equivalents that fall within the scope of this invention which have been omitted for brevity's sake. For example, although the present invention has been described with respect to a few output mechanisms for employing mechanical energy created in the combustion chamber, one of skill in the art is aware of additional mechanisms to harness mechanical energy produced by a combustion device. It is therefore intended that the scope of the invention should be determined with reference to the appended claims.

What is claimed is:

1. A method for producing mechanical energy and electrical energy from a fuel, the method comprising:

providing a fuel and an oxygen source into a combustion chamber;

combusting the fuel in the combustion chamber;

stretching a compliant segment of a wall using pressure generated in the combustion;

translating mechanical energy produced in the combustion to a mechanical output that does work;

applying an electric field to a generator that is configured to generate the electrical energy using mechanical energy produced in the combustion, wherein the electrical field is applied before the compliant portion contracts from a stretched position, wherein the electrical field slows contraction of the compliant segment from a stretched position; and generating electrical energy using mechanical energy produced in the combustion.

2. The method of claim 1 wherein the generator is also configured to operate as an actuator.

3. The method of claim 2 further comprising applying the electrical field to the actuator before combustion is complete and the electric field increases the mechanical output.

4. The method of claim 1 further comprising applying the electrical field to the actuator at top dead center of the combustion to oppose contraction forces produced in the stretch.

5. The method of claim 1 further comprising sensing position of the stretching compliant segment using the generator.

6. The method of claim 1 wherein the generator attaches to the compliant segment.

7. The method of claim 1 further comprising constraining an outer portion of the compliant segment.

8. The method of claim 1 further comprising igniting the fuel using electrical energy produced by the generator.

9. A combustion cycle for producing mechanical energy and electrical energy from a fuel, the cycle comprising:

providing a fuel and an oxygen source into a combustion chamber;

combusting the fuel in the combustion chamber;

stretching a compliant segment of a wall using pressure generated in the combustion;

translating mechanical energy produced in the combustion to a mechanical output that does work;

generating electrical energy using a generator and elastic return of the stretched compliant segment, wherein the generator is also configured to operate as an actuator; and applying an electrical field to the actuator before combustion is complete and the electric field increases the mechanical output.

10. The combustion cycle of claim 9 further comprising at least partially exhausting combustion products using elastic return of the stretched compliant segment.

11. The combustion cycle of claim 9 further comprising applying an electric field to a generator that is configured to generate the electrical energy using mechanical energy produced in the combustion.

12. The combustion cycle of claim 11 wherein the electrical field is applied before the compliant portion contracts from a stretched position.

13. The combustion cycle of claim 12 wherein the electrical field slows contraction of the compliant segment from the stretched position.

14. The combustion cycle of claim 11 further comprising applying the electrical field to the actuator at top dead center of the combustion to oppose contraction forces produced in the stretch.

15. The combustion cycle of claim 9 further comprising igniting the fuel using a portion of the electrical energy.

16. A method for producing mechanical energy and electrical energy from a fuel, the method comprising:

providing a fuel and an oxygen source into a combustion chamber;

combusting the fuel in the combustion chamber;

stretching a compliant segment of a wall using pressure generated in the combustion;

translating mechanical energy produced in the combustion to a mechanical output that does work;

applying an electric field to a generator that is configured to generate the electrical energy using mechanical energy produced in a previous combustion in the combustion chamber, wherein the generator is also configured to operate as an actuator, and the electrical field is applied to the actuator before combustion is complete and the electric field increases the mechanical output; and generating electrical energy using mechanical energy produced in the combustion.

17. The combustion cycle of claim 16 wherein the generator attaches to the compliant segment.

18. The combustion cycle of claim 16 wherein the generator is also configured to operate as an actuator and the electric field increases the mechanical output.

19. A combustion cycle for producing mechanical energy and electrical energy from a fuel, the cycle comprising:

providing a fuel and an oxygen source into a combustion chamber;

combusting the fuel in the combustion chamber;

stretching a compliant segment of a wall using pressure generated in the combustion;

translating mechanical energy produced in the combustion to a mechanical output that does work;

applying an electric field to a generator that is configured to generate the electrical energy using mechanical energy produced in the combustion, wherein the electrical field is applied before the compliant portion contracts from a stretched position, and wherein the electrical field slows contraction of the compliant segment from the stretched position; and generating electrical energy using elastic return of the stretched compliant segment.

* * * * *